(12) United States Patent
Mercat et al.

(10) Patent No.: US 8,075,065 B2
(45) Date of Patent: Dec. 13, 2011

(54) QUICK-TIGHTENING SYSTEM FOR CYCLE WITH TIGHTENING TORQUE CONTROL

(75) Inventors: Jean-Pierre Mercat, Chavanod (FR); Jean-Luc Veux, Rumilly (FR); Joseph Normand, Saint Alban Leysse (FR)

(73) Assignee: Salomon S.A.S., Metz-Tessy (FR)

( * ) Notice: Subject to any disclaimer, the term of this patent is extended or adjusted under 35 U.S.C. 154(b) by 0 days.

(21) Appl. No.: 12/331,151

(22) Filed: Dec. 9, 2008

(65) Prior Publication Data

US 2009/0102276 A1 Apr. 23, 2009

(30) Foreign Application Priority Data

Dec. 10, 2007 (FR) ...................................... 07 08577

(51) Int. Cl.
*B60B 35/00* (2006.01)
(52) U.S. Cl. .................. 301/124.2; 301/110.5
(58) Field of Classification Search ............... 301/110.5, 301/124.2; 280/279, 288; 411/402; 403/373, 403/374.1, 374.2, 374.3, 374.4, 374.5, DIG. 4, 403/DIG. 9
See application file for complete search history.

(56) References Cited

U.S. PATENT DOCUMENTS

| | | | | |
|---|---|---|---|---|
| 2,511,985 A | * | 6/1950 | Juy | ............................ 301/124.2 |
| 3,948,141 A | | 4/1976 | Shinjo | |
| 4,598,614 A | * | 7/1986 | Kipp | ............................... 81/58.3 |
| 5,312,166 A | | 5/1994 | Nagano | |
| 5,447,362 A | | 9/1995 | Nagano | |
| 5,865,560 A | * | 2/1999 | Mercat et al. | ............... 403/322.4 |
| 6,461,111 B1 | * | 10/2002 | Haugen et al. | ............ 416/244 R |
| 7,562,942 B2 | * | 7/2009 | D'Aluisio | ................... 301/124.2 |
| 2007/0145814 A1 | | 6/2007 | D'Aluisio | |
| 2007/0154286 A1 | | 7/2007 | Spahr | |

FOREIGN PATENT DOCUMENTS

| | | |
|---|---|---|
| EP | 0 486 002 A1 | 5/1992 |
| EP | 0 582 728 A1 | 2/1994 |

* cited by examiner

*Primary Examiner* — Joe Morano, IV
*Assistant Examiner* — Kip T Kotter
(74) *Attorney, Agent, or Firm* — Greenblum & Bernstein, P.L.C.

(57) ABSTRACT

A quick-release system for a quick-release device, in particular for a cycle, such as a bicycle, the device being of the type including an axially extending skewer and an end support element mounted on a first end of the skewer adapted to be supported on a first tightening surface of the cycle. The quick-release system includes a tightening sub-assembly including a support surface and an actuation sub-assembly including a movable actuating mechanism, capable of axial rotation around the skewer and configured to transmit a tightening torque to the tightening sub-assembly when the device is being tightened. The system includes tightening torque limiting mechanism making it possible to limit the torque transmitted by the actuation sub-assembly to the tightening sub-assembly.

29 Claims, 15 Drawing Sheets

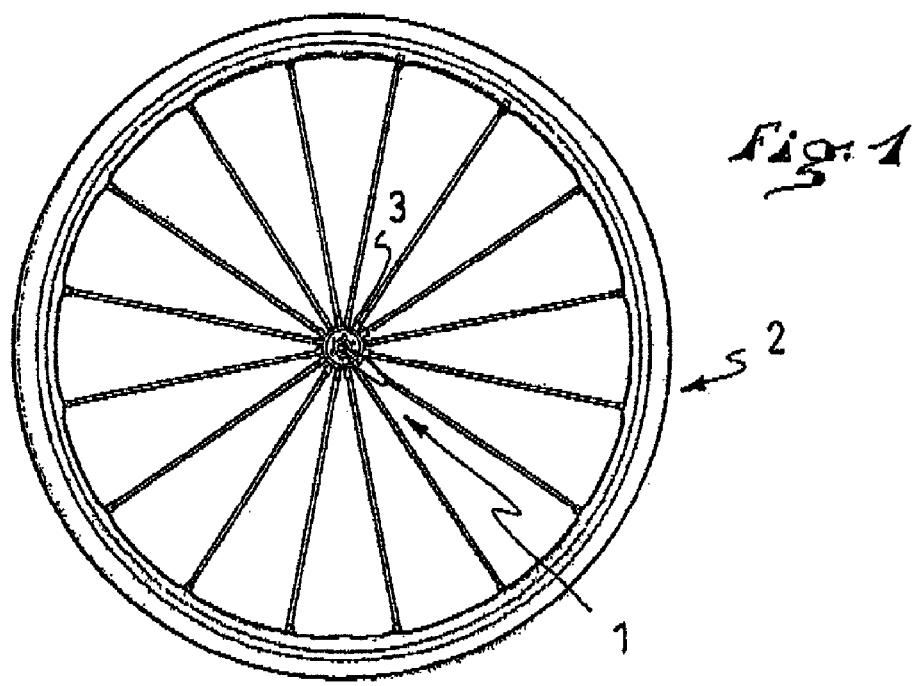
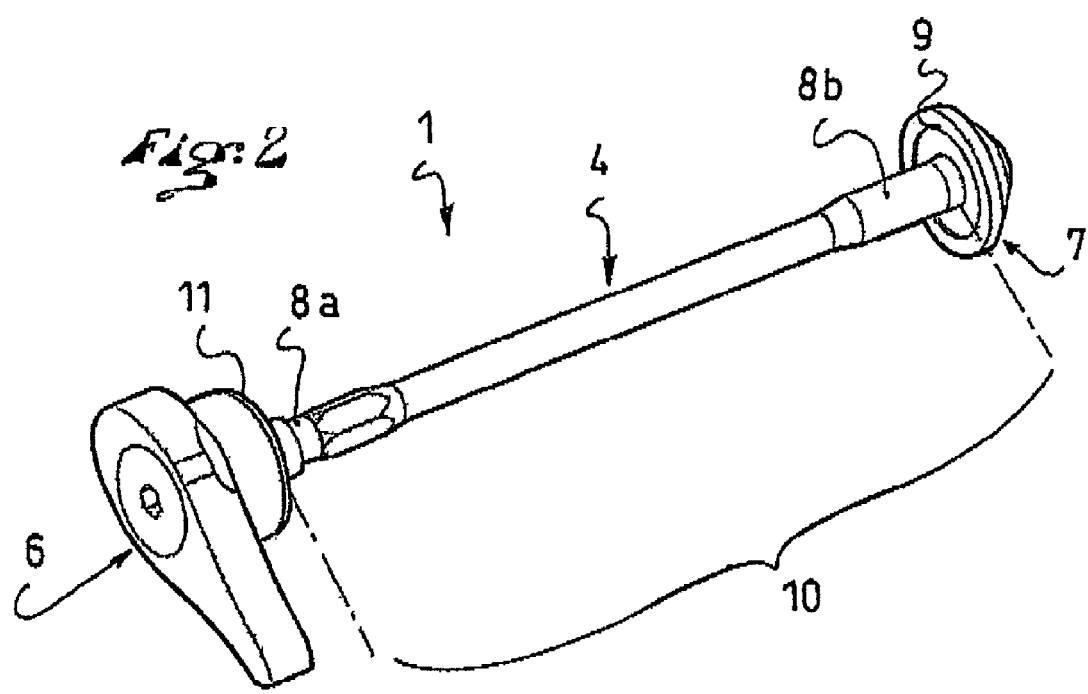

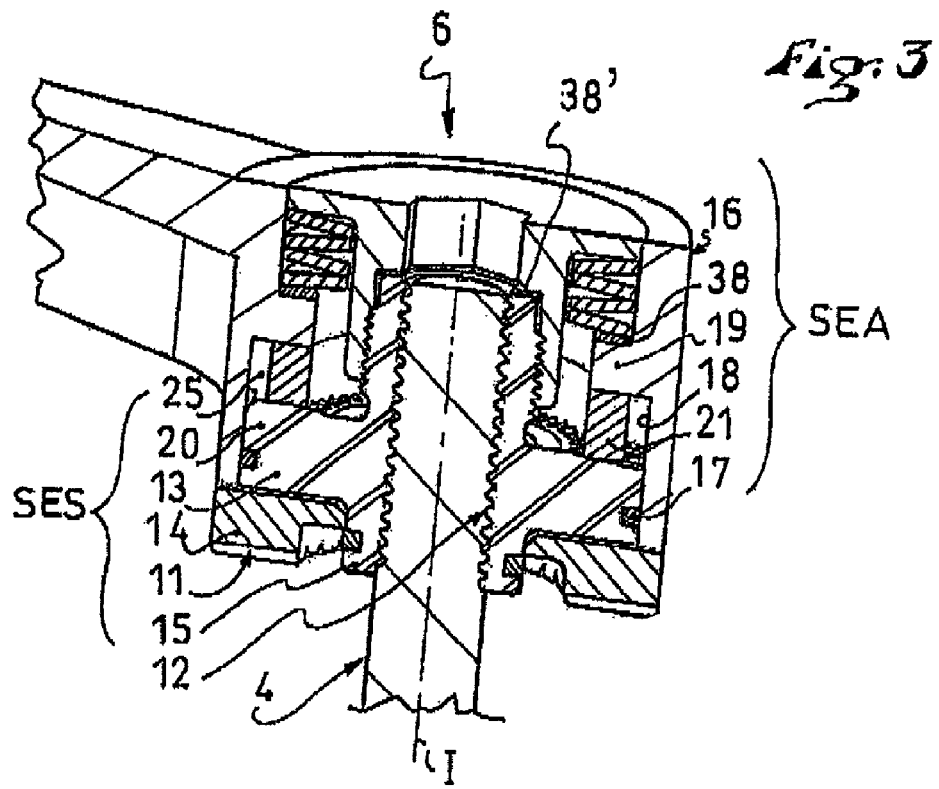
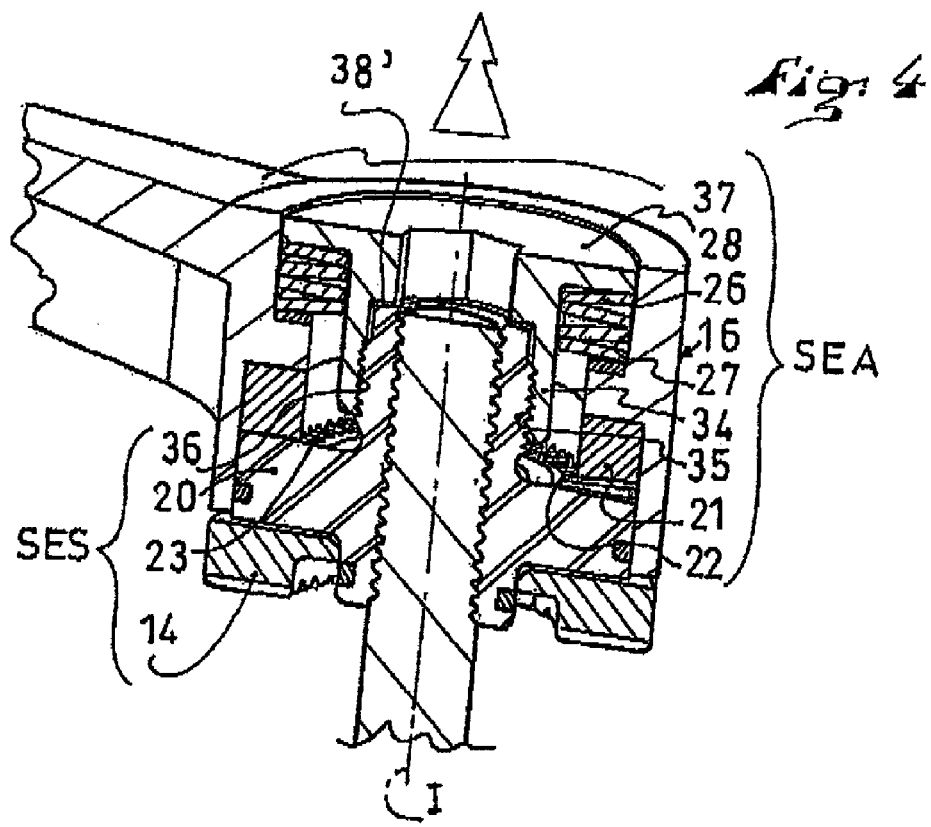

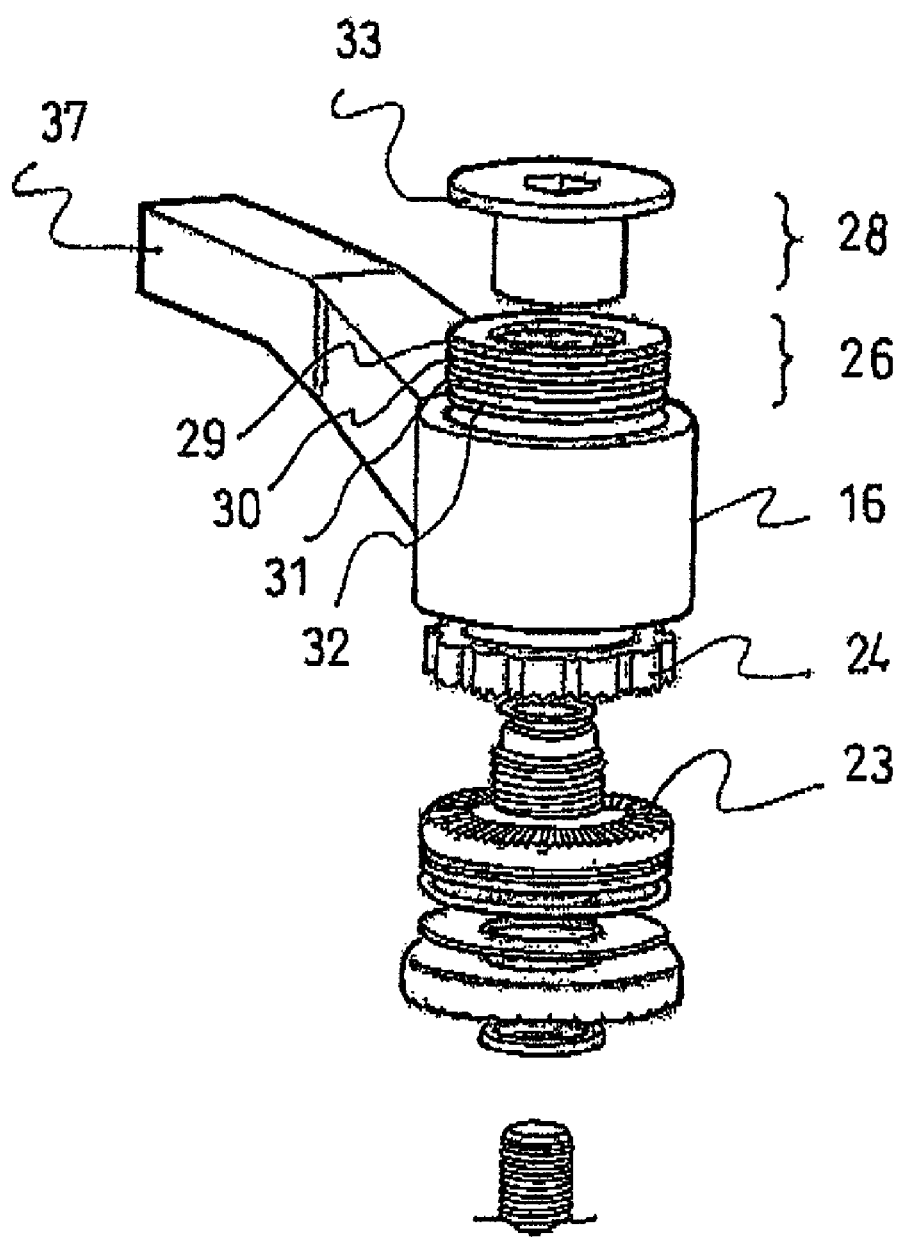

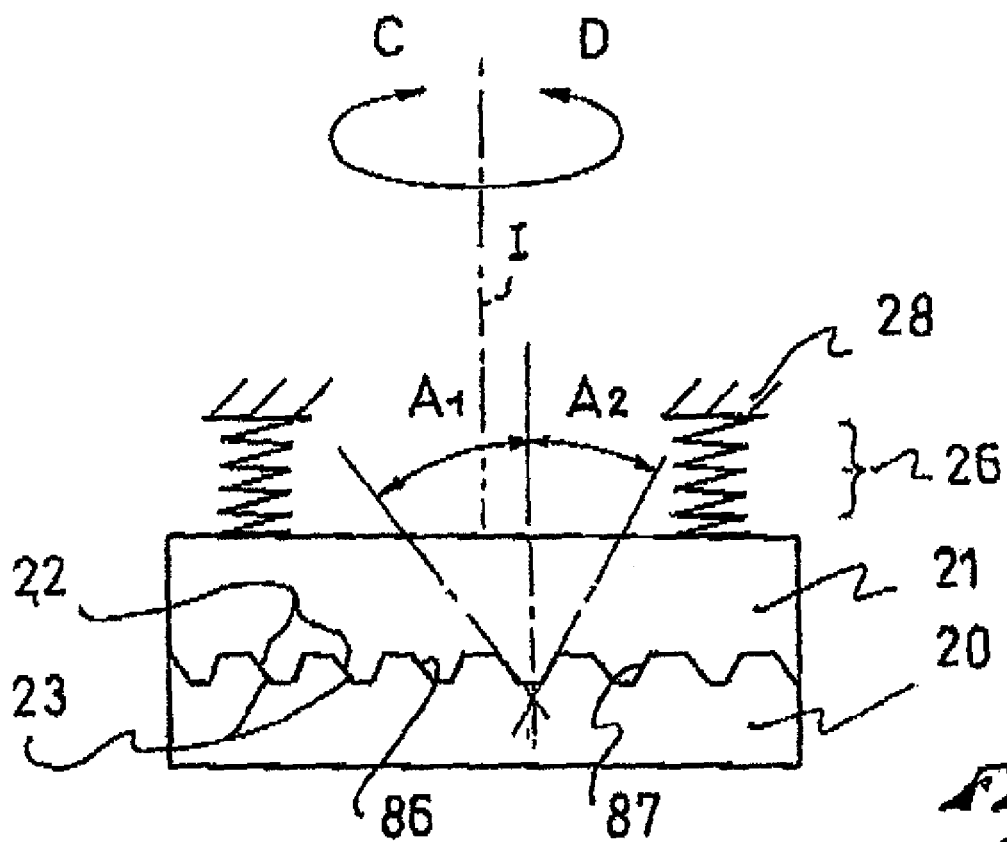
*Fig: 6*
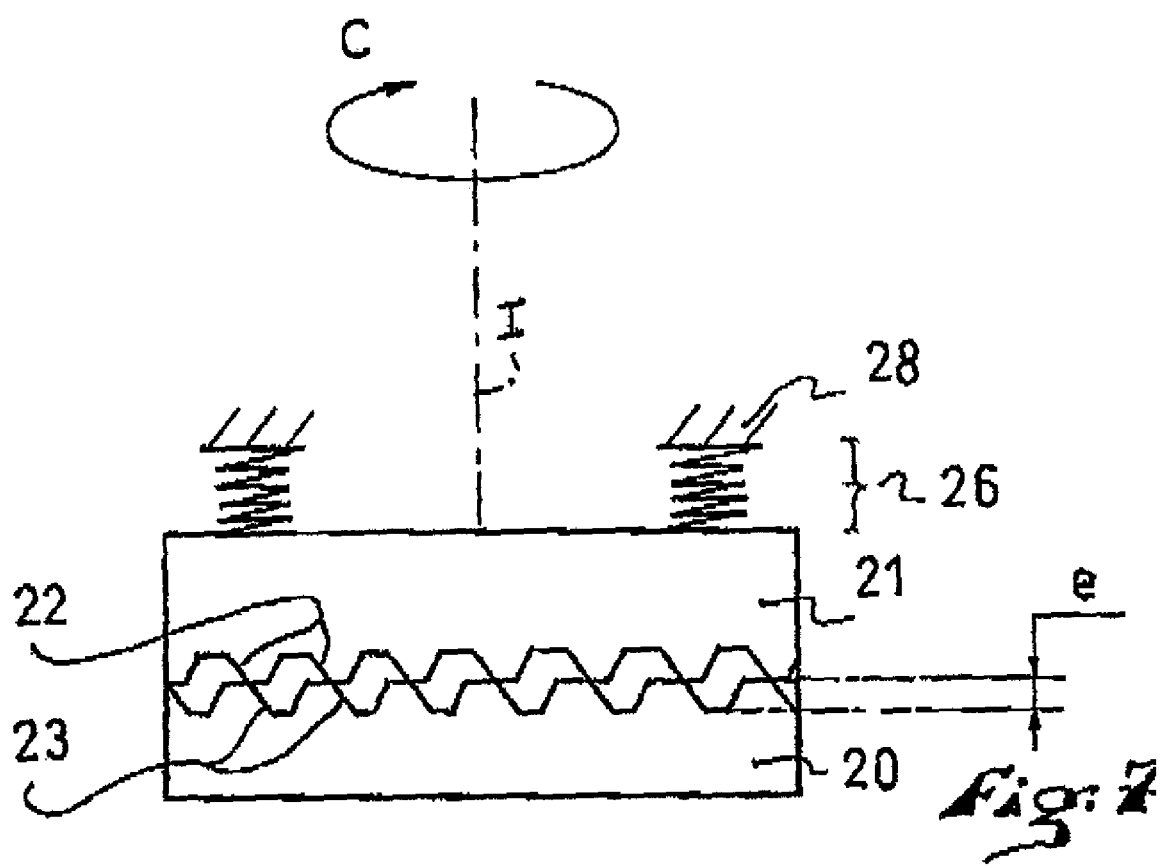
*Fig: 7*

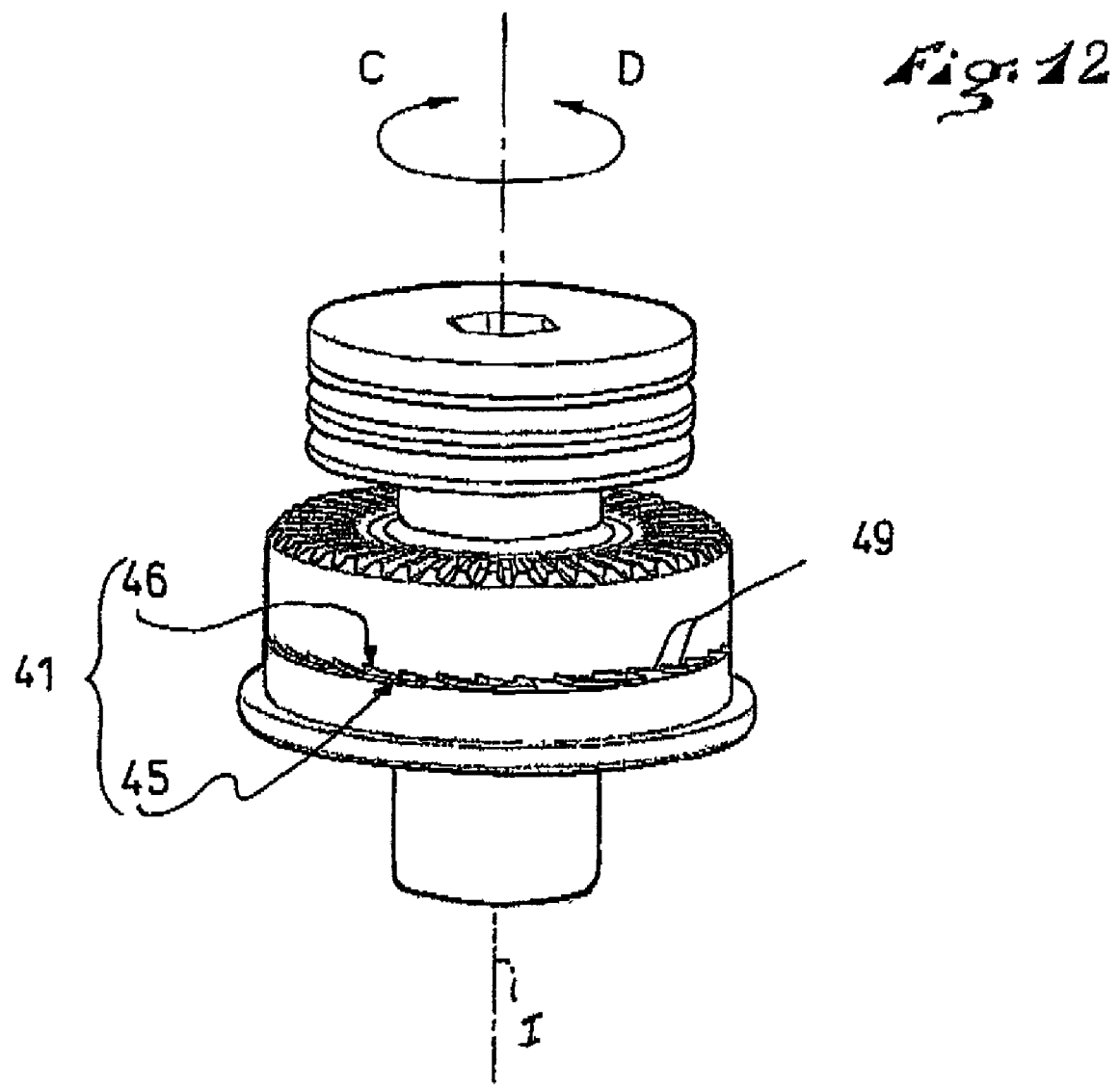

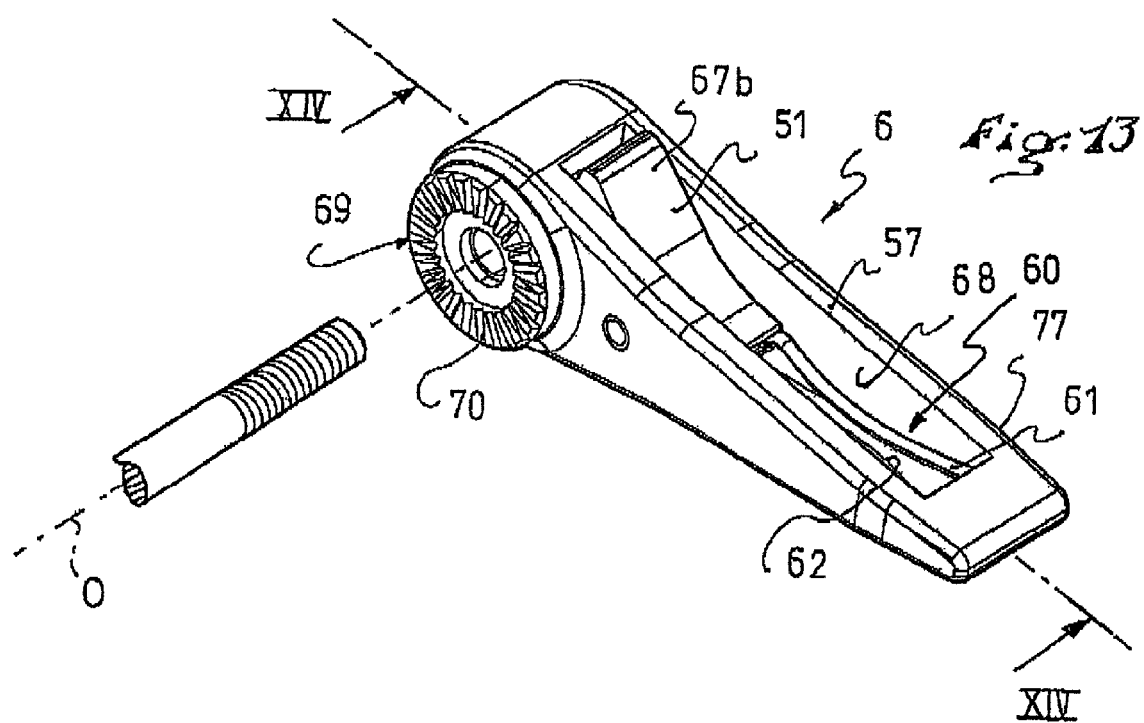

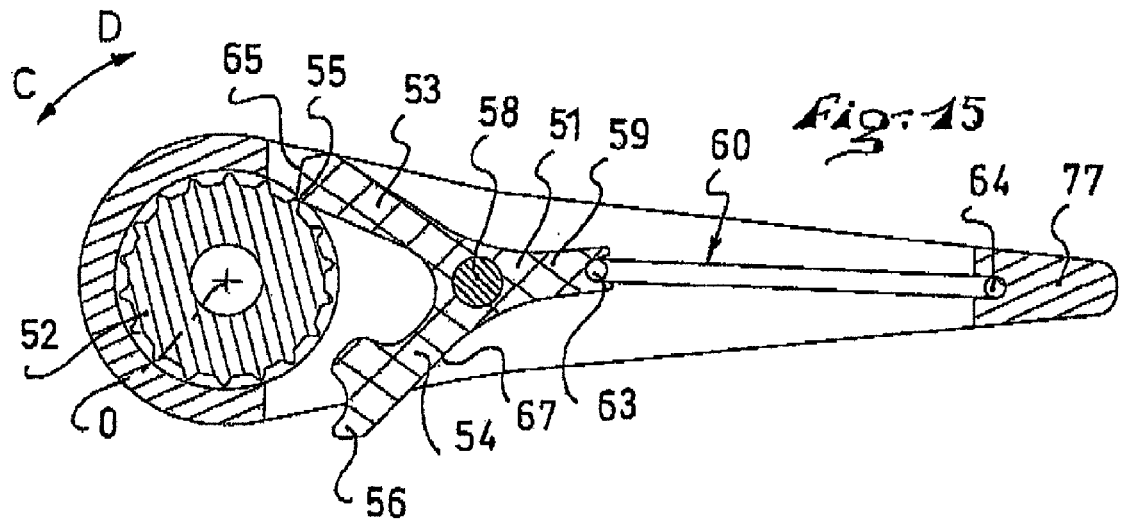
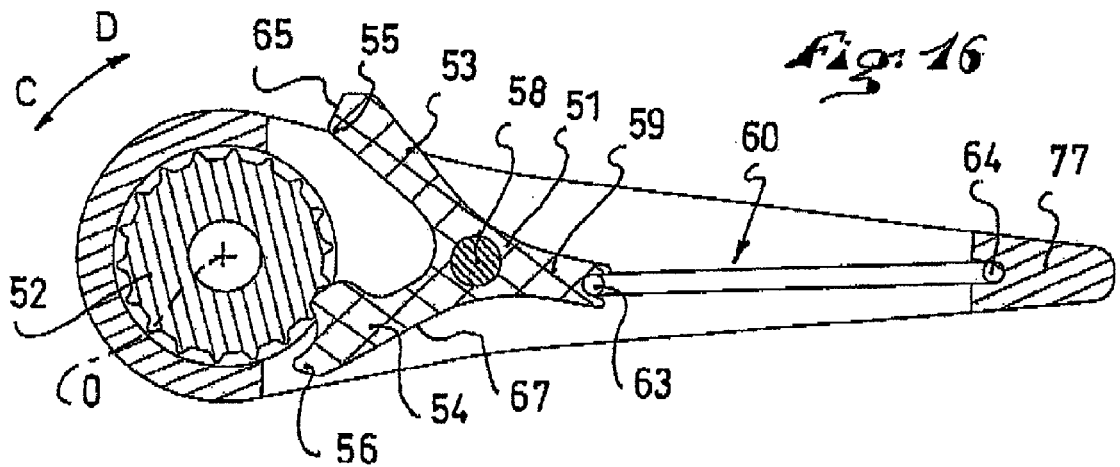
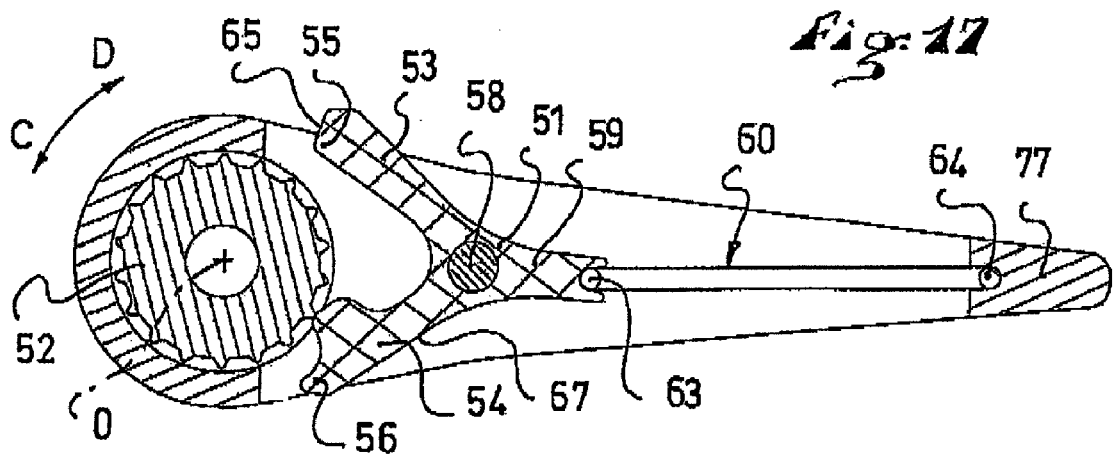

QUICK-TIGHTENING SYSTEM FOR CYCLE WITH TIGHTENING TORQUE CONTROL

CROSS-REFERENCE TO RELATED APPLICATION

This application claims priority under 35 U.S.C. §119 of French Patent Application No. 07 08577, filed on Dec. 10, 2007, the disclosure of which is hereby incorporated by reference thereto in its entirety.

BACKGROUND OF THE INVENTION

1. Field of the Invention

The present invention relates to a quick-release system, in particular for a cycle. The invention also relates to a complete quick-release device, also commonly called "quick-release axle", and to a wheel including such a device.

2. Description of Background and Other Information

In the field of cycles, it is known to use quick-release devices to assemble a component on a portion of the cycle quickly, such as a wheel to a fork, for example. These devices eliminate the need to use special tools, such as wrenches or the like. The quick-release devices can be used on a front wheel as well as on a rear wheel of a bicycle. The fastening device can also be used to secure various components on a cycle, such as a saddle to a seat tube.

Various existing quick-release systems are commonly used. The most widespread family of these devices includes those with a lever acting on a cam to exert a tightening force that is a function of the geometry of the cam and of the manual pre-adjustment of the center distance. In particular, the device includes a threaded rod commonly referred to as a "quick-release skewer," having, at a first end, a movable or fixed stop, such as a tightening nut and/or a cam, and its other end, a quick-release mechanism including a lever mounted along an axis perpendicular to the axis of the skewer, an adjustable nut, and an intermediate cam. Various embodiments exist. In certain cases, the cam is integral with the lever; in other cases, it can be a separate element.

In all examples of these devices, the tightening force is obtained when the cam is driven by pivoting the lever in the direction of the skewer, from an opening position to a folded closed position. Before the lever is brought to the closed position, the tightening force is usually adjusted by screwing the release mechanism on the skewer. This adjustment is carried out by means of a nut that is part of the mechanism, which determines the center distance between the two tightening surfaces of the device, on each side of the skewer.

These devices pose a number of problems. Initially, they do not enable a good control of the tightening force, which can vary substantially depending upon the adjustment of the center distance, by the user, by means of the adjustment nut of the quick-release mechanism. A center distance adjusted to be too long at the outset can produce an insufficient tightening and thus cause a possible safety problem. The skewer fulfills the function of a tension spring, and its elasticity enables it to withstand the tension forces. An adjusted center distance adjusted to be too short, on the contrary, can cause an axial tension force on the skewer that is too substantial, and thus a risk of rupture of the skewer or breakage of another element of the device. A too substantial tension force also produces compression forces on the hub bearings. As a result, the bearings may be compressed and therefore damaged, thus causing substantial friction in the hub. Moreover, a device of this type is not easy to use, and the user has to proceed by trial and error in adjusting the center distance in order to achieve the correct tightening.

Therefore, the magnitude of the tightening force is never the same, and it depends upon the pre-adjustment of the center distance by the nut, and therefore, for the most part, upon the user's strength. The tightening magnitudes can vary substantially, resulting in risks of loosening in the case of insufficient tightening or, conversely, of failure/breakage of the skewer, in the case of excessive tightening. In order to guarantee the resistance of the skewer against failing under very high torques, the skewer is generally made of a high strength material and is oversized compared to the intended use under normal forces. With equivalent resistance to failure, the skewer can be made of a lighter material, such as titanium, in order to reduce weight, in particular for competition bicycles. Oversizing the elements and/or using light-weight materials such as titanium is expensive.

Another problem associated with a device of this type comes from the difficulty of obtaining a correct orientation of the lever at the end of the tightening and the correct tightening force at the same time. It is indeed preferable to direct the lever so that it does not constitute a "hook" for becoming engaged with external elements (branches, banners, wire, etc.) during practice, which can cause loosening of the wheel or collisions and, consequently, a potential danger of falling.

U.S. Patent Application Publication No. 2007/0154286 relates to a quick-release device offering an easier use. It includes a rotationally actuatable lever configured to tighten an internal nut against the skewer. The lever is axially movable against the force of an elastic tensioning mechanism in order to be capable of being manually disengaged from the nut and of assuming an angular position that can be selected independent of the nut tightening state. Thus, the main advantage is to be able to facilitate the tightening action by repositioning the lever and/or enabling the final orientation of the lever without loosening the device. However, this device does not improve the control of the tightening force. All of the problems mentioned in relation to the lack of control of the tightening force thus subsist in this device. For example, the tightening of the device remains subject to the judgment of the user and remains dependent upon the user's physical strength.

U.S. Pat. No. 5,447,362 is also based on a system for increasing tightening by means of a lever mechanism. The improvement lies in providing a system for visualizing the tightening by increasing the displacement of a tube-shaped tightening indicator. However, although it provides an indication of the tightening value, such a device does not entirely solve the problems associated with excessive or insufficient tightening of the device.

Therefore, there exists a need to provide a solution for a quick-release device that solves problems found in the prior art.

In particular, there is a need to improve the control and management of the tightening force for the user, without this force being directly a function of the user's physical strength. In particular, there is a need to apply a tightening amplification that can actually be controlled and reproduced.

There also exists a need to provide the user with an indication of the correct tightening, this being an easily perceptible indication.

There is also a need to generally eliminate the possibility of applying an excessive tension force to the skewer of the device that can damage the elements and/or the need for oversizing or using expensive materials having exceptional mechanical characteristics. There is also a need to reduce the weight of the device.

There also exists a need to improve the tightening efficiency of a release device.

Further, there is a need to prevent or to make unlikely an ill-timed loosening of the release device, for obvious reasons of user safety.

Still further, there exists a need to allow for an easy repositioning of the lever of the device that is not dependent upon the tightening force exerted by the device.

SUMMARY OF THE INVENTION

The invention provides a quick-release system for a quick-release device, in particular for a cycle, of the type including a tightening shaft, or skewer, extending in an axial direction and an end support element mounted on a first end of the skewer adapted to be supported on a first tightening surface of a cycle, the quick-release system including a tightening sub-assembly (SES) including a support surface and an actuation subassembly (SEA) including a movable actuating arrangement, capable of axial rotation around the skewer and configured to transmit a tightening torque to the tightening sub-assembly (SES) when the device is being tightened, and including tightening torque limiting mechanism that make it possible to limit the torque transmitted by the actuation sub-assembly (SEA) to the tightening sub-assembly (SES).

The tightening torque limiting arrangement form a disengageable connection interface that limits the torque transmitted by the actuation sub-assembly (SEA) to the tightening sub-assembly, starting from a limiting value of the torque or from a predefined range of tightening torques. An arrangement to mount the system on the skewer of the device are provided, including a threaded portion of the tightening sub-assembly that is configured to be screw-threadedly engaged to the end of the skewer.

The disengageable connection interface is formed by engagement of two friction portions that can include portions in contact with one another, which disengage starting from a limiting torque value or from a preset range of tightening torques. The two friction portions disengage against an elastic tensioning mechanism that applies an elastic force of the actuation sub-assembly (SEA) against the tightening sub-assembly (SES). An arrangement to adjust the pre-stressing of the elastic tensioning mechanism can be provided.

The invention also provides a quick-release system for a quick-release device, in particular for a cycle, of the type including a skewer extending in an axial direction and an end support element mounted on a first end of the skewer adapted to be supported on a first tightening surface of a cycle; the quick-release system including a tightening sub-assembly (SES) including a support surface and an actuation sub-assembly (SEA) including a movable actuating mechanism, capable of axial rotation around the skewer and configured to transmit a tightening torque to the tightening sub-assembly (SES) when the device is being tightened, and further including an interface for friction differential between the tightening and loosening modes, configured to promote slip between a support mechanism and a tightening mechanism in the tightening direction, and the generation of friction between such support mechanism and the tightening mechanism in the loosening direction. The interface includes a freewheel and can include, at least, a selective retention mechanism including a freewheel slip ring having retaining edges that cooperate with notches, tightening mechanism, the freewheel ring including radial blades with raised edges, and the interface further including a washer configured to promote the slip between the freewheel ring and the tightening mechanism.

The invention also provides a quick-release system for a quick-release device, in particular for a cycle, of the type including a skewer extending in an axial direction and an end support element mounted on a first end of the skewer adapted to be supported on a first tightening surface of a cycle; the quick-release system including a tightening sub-assembly (SES) including a support surface and an actuation sub-assembly (SEA) including a movable actuating mechanism, capable of axial rotation around the skewer and configured to transmit a tightening torque to the tightening sub-assembly (SES) when the device is being tightened, the tightening sub-assembly including a shaft provided with a threaded opening that is capable of engaging the threaded portion of the skewer, and the threaded portion of the skewer and that of the threaded opening having a large pitch, for example greater than 1.5 mm, for a diameter of 5 mm.

To increase the strength, one can provide for the threaded portion to include several threads.

The invention also provides a quick-release device, in particular for a cycle, of the type including a skewer extending in an axial direction and an end support element mounted on a first end of the skewer adapted to be supported on a first tightening surface of a cycle; the quick-release system including a tightening sub-assembly (SES) including a support surface and an actuation sub-assembly (SEA) including a movable actuating mechanism, capable of axial rotation around the skewer and configured to transmit a tightening torque to the tightening sub-assembly (SES) when the device is being tightened, a torsional stress recovery mechanism arranged on the skewer in the vicinity of the actuation sub-assembly.

In one embodiment of the invention, the torsional stress recovery mechanism includes a portion of the skewer that has a polygonal cross section.

The invention also provides a bicycle wheel that includes a hub, a rim, an arrangement for connecting the rim to the hub (spokes, compression spokes, disk, etc.), the hub having a channel for the skewer of the quick-release device to pass through, the opening of this channel having a cross section with an hexagonal shape or a more generally polygonal shape.

To this end, the invention, in certain embodiments, is primarily based on the integration of a system for limiting the tightening torque transmitted by the actuation mechanism to the tightening surfaces of the device.

In its principle, the torque limiting system functions such that when the tightening torque value or range of tightening torques is reached and that optimal tightening against the tightening surfaces is thus obtained, the transmitted torque then reaches a limiting value that is lower than the value necessary to increase the tightening force on these surfaces.

The limiting torque value reached can be obtained by a mechanical or physical disengagement of the system.

The system can thus function on the basis of a disengageable mode of the device, which is a function of the value of the torque exerted by the lever or of a preset torque value range.

The disengagement action can be based on a connecting mechanism between two friction surfaces that are elastically kept in contact and which separate from one another beyond a certain torque threshold reached. For example, the two contact surfaces can form a mechanism for meshing two portions of the system that are kept in contact by an elastic element, and which partially disengage from one another by deformation of the elastic element, or by deformation of at least one of the two portions.

The system of the invention can also include a mechanism for adjusting the limiting value/torque range in which the disengagement occurs.

When the system disengages, the relative friction movement between the connecting mechanism can generate a rubbing or rattling noise forming an audio signal that provides an indication that the optimal tightening value has been reached by the system.

More particularly, the invention relates to a quick-release system for a quick-release device, in particular for a cycle, including a skewer extending in an axial direction and an end support element mounted on a first end of the skewer adapted to be supported on a first tightening of a cycle; the quick-release system including a mechanism for mounting on a second end of the skewer, the system including a tightening sub-assembly (SES) including a support surface and an actuation sub-assembly (SEA) including an actuating mechanism movable in axial rotation around the skewer, capable of transmitting a tightening torque to the tightening sub-assembly when the device is being tightened, wherein a tightening torque limiting mechanism makes it possible to limit the torque transmitted by the actuation sub-assembly to the tightening sub-assembly.

More specifically, the system for limiting the tightening torque forms a disengageable connection interface that limits the torque transmitted by the actuation sub-assembly to the tightening sub-assembly, starting from a maximum limiting value of the torque or from a preset range of tightening torques. The connection interface is thus disengaged beyond a certain rotational stroke of the actuating mechanism, and the disengaging continues if the rotation of the lever continues in the tightening direction. After the disengagement, the torque transmitted by the actuation sub-assembly reaches a maximum value or a value lower than the maximum value of the tightening torque reached prior to the disengagement, so that the tightening force itself reaches a maximum value of tightening force.

The actuating mechanism can be a lever or any other type of suitable mechanical mechanism that makes it possible to transmit a torque. For example, it can also be a serrated roller.

In an embodiment encompassed by the invention, the disengageable connection interface is formed by engagement of two friction portions in contact with one another, which disengage at least partially starting from a limiting value of the torque or from a preset range of tightening torques. At the time of disengagement, at least partial disengagement, of the friction portions, the transmitted torque does not increase any more but reaches the maximum value, except for the friction forces.

According to a particular feature of the invention, the arrangement for mounting the system on the skewer of the device includes a screw portion of the tightening sub-assembly that is configured to engage the end of the transverse skewer by being threadedly engaged thereon.

According to another feature of the invention, the two friction portions disengage against an elastic tensioning mechanism. Depending upon the elastic tensioning element used, the axial force and the amount of movement for disengaging the contact surfaces can be controlled. For example, the elastic tensioning mechanism can be a spring of the Belleville spring washer type or helical washer, or an elastomeric block. For example, a plurality of Belleville spring washers can be employed in order to increase the precision of the disengaging stroke and, therefore, the precision of the tightening force transmitted.

In a particular embodiment of the invention, the elastic mechanism can be an elastic portion of at least one of the friction portions. For example, at least one of the elastic portions can be formed in a durable plastic material having good elasticity properties.

According to one complementary characteristic, the device includes a mechanism for adjusting the pre-stressing of the elastic tensioning mechanism. Such mechanism can be, for example, at least one adjusting ring and/or one counter-nut and/or at least one interchangeable wedge. This ring and/or interchangeable wedge can be arranged between the elastic tensioning mechanism and a portion of the actuating mechanism, such as the body of the lever, for example. The advantage of an adjusting mechanism lies in the possibility of adjusting the tightening force. This adjustment can be provided at the time the device is mounted, for example during manufacture. According to another possibility, it can be adjusted by the user himself/herself.

According to one aspect of the invention, the two contact portions of the disengageable connection interface can be toothed portions that are mutually engageable. According to various possible methods of construction, the engagement between the toothed portions can extend in an axial or radial direction relative to the tightening direction. The advantage of toothed portions results in greater reliability and better control of the disengagement. Also, during the disengagement, the toothed portions rub against one another and set off a disengaging signaling sound signal and consequently an indication that the threshold of the final tightening has been reached.

In a first method of construction of the invention, the elastic tensioning mechanism is configured to apply an axial force of the actuation sub-assembly against the tightening sub-assembly, so that the disengageable connection interface disengages primarily by means of a relative axial and angular displacement between the contact portions of the actuation sub-assembly and against the tension of the elastic tensioning mechanism.

According to one particular characteristic, at least one of the toothed portions has a dissymmetrical tooth profile configured to oppose a greater resistance to the disengagement, in the direction of rotation of the lever providing the loosening, rather than in the direction of rotation of the lever providing the tightening of the tightening sub-assembly. Such a configuration makes it possible to unlock the device without risk of disengaging in the loosening direction, in particular in the event that the device is seized. In a particular embodiment, the toothed portions have a symmetrical tooth profile.

For example, the elastic tensioning mechanism can be formed by at least one Belleville spring washer. The mechanism can include a plurality of serially mounted Belleville spring washers. The advantage of this particular elastic mechanism is that it is compact and adapted to short displacements against substantial elastic forces.

According to one characteristic of the invention, the driving toothed portion of the disengageable connection interface is formed by a ratchet that includes a ring gear.

In a particular embodiment, the elastic tensioning mechanism is positioned in a cavity between the actuating mechanism and the ratchet.

A screw for adjusting the tension of the elastic tensioning mechanism can be provided so as to make it possible to adjust the pre-stress of the elastic mechanism. The elastic tensioning mechanism can be positioned in a cavity, between an adjusting screw and a shoulder of the actuating mechanism. In this case, the ratchet can be rotationally affixed to the actuating mechanism. The invention encompasses a body of an actuating mechanism and a ratchet that are made of a single piece, such as an element that is made unitary by machining or having been injection molded.

For example, the ratchet is rotationally affixed to the actuating mechanism by a radial grooved portion that engages a cylindrical portion of the actuating mechanism body, which includes inner grooves having a shape complementary to the grooves of the ratchet.

According to another particular embodiment of the invention, the disengageable connection interface is formed by at least one pawl acting on at least one toothed portion. The advantage of a "pawl" principle comes from the possibility of facilitating the tightening operation, at least by a pumping effect. In other words, to obtain the tightening, the lever can be actuated along a limited angular stroke in the tightening direction and can be actuated at the rear in order to resume the tightening, in the initial angular position, without loosening the device. Thus, tightening can be carried out more quickly and without it being necessary for the lever to make several turns.

According to a more specific characteristic, the pawl or the toothed portion has an asymmetrical toothed profile configured to provide the "pumping", at least in the tightening position.

According to another characteristic, the pawl engages at least one toothed portion of the tightening sub-assembly by the elastic effect of an elastic tensioning mechanism. Various elastic mechanisms can be used, such as a wire spring, blade spring, or a compression spring, such as a helical spring or an elastomeric block. The characteristics of the spring (stroke, stiffness) determine, in theory, the conditions of the pawl disengagement with respect to the toothed portion. Other characteristics, such as the geometry of the teeth and the constitutive materials of the elements in contact, cooperate in the disengaging conditions.

In one embodiment of the invention, the toothed portion has a shape of revolution, such as a wheel. However, the invention encompasses a quick-release system, in which the toothed portion assumes a non-revolving shape, but a curved or straight shape such as a toothed rack.

According to a first embodiment, the pawl is rockingly movable against the toothed portion. For example, the pawl is mounted along at least one rotational transverse axis.

In a more specific embodiment, the pawl, together with the elastic tensioning mechanism, can form a knuckle joint, or over-center/bi-stable device, for switching between a stable tightening position and a stable loosening position. Such switching forces the user to force the knuckle joint into one or the other position with the passage of the hard spot or friction point. Thus, one advantage is to have a simple, reliable system making it possible to safely switch from the tightening mode to the loosening mode and vice versa.

According to this particular embodiment, the pawl includes two opposite pawl portions configured to engage alternately at least on toothed wheel. For reasons of cost-effectiveness and ease of technical implementation, the two pawl portions can be made as a single part. However, the invention encompasses two portions forming two separate pawls. In one configuration, each pawl portion then engages the same toothed wheel. In particular, the pawls engage the wheel in opposite positions at approximately 180 degrees or less than 180 degrees.

In one particular alternative, each pawl portion engages a distinct toothed wheel. An advantage can be to be able to manage the geometry of the teeth in the tightening and loosening modes more finely, to adjust the disengagement during tightening.

In another particular embodiment, the pawl can be axially movable in a housing of the body of the quick-release system. Moreover, the pawl can be locked by a locking mechanism in the loosening mode, so that loosening is undertaken only intentionally and by turning the lever several times about the skewer.

According to another inventive aspect of the system according to the invention, the quick-release system includes an interface for the friction differential between the tightening and loosening modes, which is configured to promote slip between a support mechanism and a tightening mechanism in the tightening direction, as well as the generation of friction between the support mechanism and the tightening mechanism in the loosening direction. Such an interface mounted on the system makes it possible to increase the efficiency of the tightening forces and to improve safety in order to reduce the risk of undesired loosening.

In particular, this interface can include at least a selective retaining mechanism. Such mechanism can include, for example, a freewheel slip ring having retaining edges that cooperates with notches of the tightening mechanism. The tightening mechanism can be, in the example of the invention, a tightening shaft including a threading adapted to be screwed onto the end of the skewer. However, other tightening mechanisms are within the scope of the invention. Still in the context of the invention, the support mechanism can be a support washer rotationally mounted relative to the shaft. Such a washer includes, as is known, a tightening surface that is provided with notches and is adapted to engage by tightening against a cycle surface to be tightened, such as the support surface of an end of a fork arm, for example.

The intermediate ring can include radial blades provided with raised edges, for example. The interface can further include a configured washer to promote the slip between the freewheel ring and the tightening mechanism. In a particular embodiment, the washer includes at least one sliding layer made of a material with lower coefficient of friction compared to the material of the freewheel ring. The material of the washer includes at least one sliding layer made of loaded PTFE. Still according to a particular embodiment, the disc has a smaller outer diameter than the diameter of the freewheel ring in order to reduce the tightening torque. In one alternative according to the invention, the interface includes a single freewheel ring having a sliding surface to generate a slip in the tightening direction and a friction surface to generate friction in the loosening direction.

The system according to the invention can be mounted on any type of quick-release device commonly referred to as a "quick-release skewer". The invention also relates to a quick-release device or skewer provided with such a release system, the device including a skewer extending in an axial direction, an end support element mounted on a first end of the skewer, and the system of the invention mounted on the second end of the skewer.

According to one advantage of the invention, a weight reduction can be obtained by a skewer made out of a material having a relatively low density and sufficient mechanical strength, by taking into account the force values which it must support within the context of the device of the invention. To this end, the skewer can have a lower mechanical resistance to traction than the conventional skewers, due to the fact that the values/magnitudes of the tightening forces are better controlled, without becoming too substantial. For this, the material of the skewers can be an aluminum-base alloy having a mechanical strength Rm ranging between 450 and 950 Mpa, and a density ranging between 2.6 and 2.9. The skewer can be made of an aluminum and zinc alloy whose mechanical strength characteristics are about 500 MPa or 700 MPa. An alloy of about 1000 Mpa, such as titanium, does not have as good a machinability and is very expensive compared with alloys with lower mechanical strength values. Skewers made of composite materials containing carbon fibers or the likes, or combined with a metal alloy, can also be used. Finally, the invention encompasses the use of high-strength steel skewers, a high mechanical strength Rm of about 1400 Mpa, for example, by decreasing the diameter in order to reduce the weight of the device. A magnesium alloy with a high mechanical strength Rm of approximately 340 Mpa and a density of 1.8 also is within the scope of the invention.

According to another embodiment of the invention, an arrangement to recover the torsional stresses is arranged between the quick-release device and the hub. This arrangement to recover the torsional stresses can constitute a complementarity of form between a portion of the skewer and of the hub.

According to one particular characteristic of the invention, the skewer has a generally cylindrical shape that is interrupted by a polygonal portion having for a function to take up the torsional stresses with the hub. This polygonal portion can be relatively short, about 2 to 20% of the length of the skewer. It can be arranged in the vicinity of the quick-release system so as to release the portion of the skewer opposite the portion on the side of the system for blocking the torsional stresses. The cylindrical portion arranged on the side opposite to the quick-locking system can have a smaller diameter than the diameter of the cylindrical portion positioned on the side of the release system, because such cylindrical portion with a smaller diameter does not support the traction forces.

The invention also relates to a wheel including such a device. In particular, the invention relates to a wheel including a rim, a hub, an arrangement for connecting the rim to the hub, such as spoke sets and/or solid wheel body, and at least one quick-release device or skewer provided with the quick-release system according to the invention; the device including a skewer extending along the axis of the hub.

BRIEF DESCRIPTION OF DRAWINGS

The invention will be better understood and other advantages will become apparent from the following detailed description, with reference to the annexed drawings, and in which:

FIG. 1 shows a general view of a cycle wheel including the quick-release device according to the invention;

FIG. 2 is a perspective view of a complete quick-release device according to a first embodiment of the invention;

FIG. 3 is a cross-sectional view of a portion of the device, more precisely of the quick-release system of the device of FIG. 2 in the engaged mode (tightening/loosening);

FIG. 4 is a cross-sectional view of the release system in the disengaged mode (end of tightening);

FIG. 5 is an exploded view of the system of FIG. 4;

FIG. 6 is a schematic view of the connection interface of the system in the engaged mode (tightening/loosening);

FIG. 7 is a schematic view of the connection interface of the system in the disengaged mode (end of tightening);

FIG. 12 is a partial, perspective, exploded view of the system of FIG. 10 (in particular, without the ratchet and the body of the actuating mechanism);

FIG. 13 is a perspective view of a release system according to a fourth embodiment;

FIG. 15 is a cross-sectional view, along the line A-A, of the system of FIG. 13 in the disengaging position during tightening;

FIG. 16 is a cross-sectional view along the line A-A of FIG. 13 in the loosening position;

FIG. 17 is a cross-sectional view along the line A-A of FIG. 13 in the freewheel position upon loosening;

DETAILED DESCRIPTION OF THE INVENTION

Figure 5B:
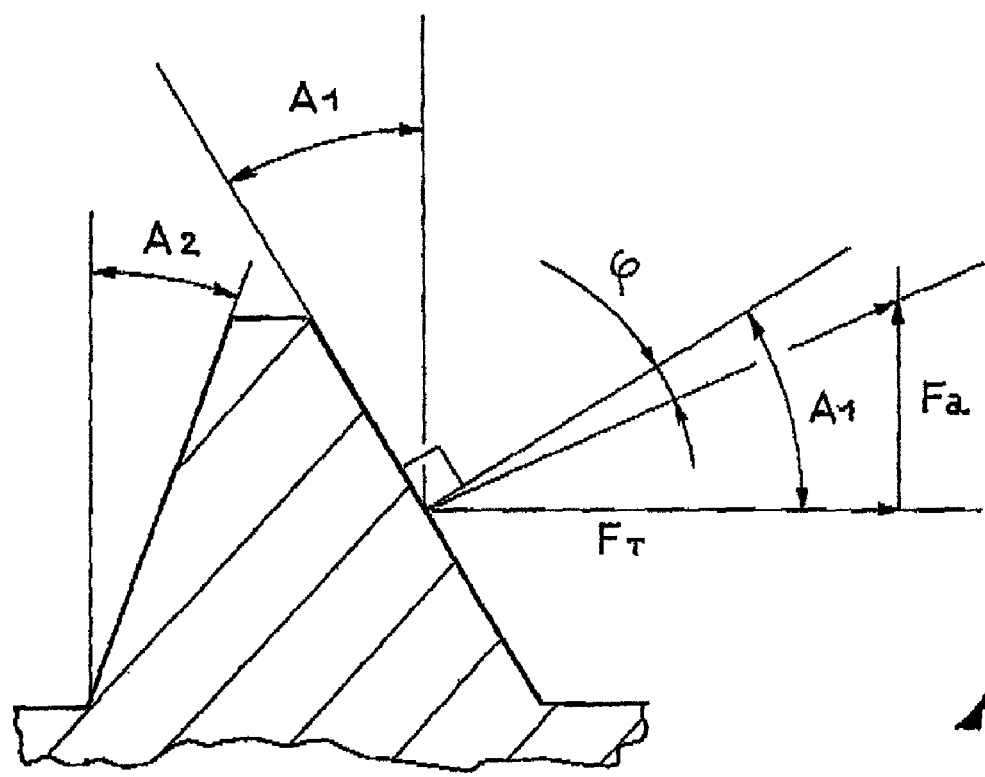
FIG. 5b is a partial cross-sectional view of a tooth of the ratchet according to the first embodiment of the invention.

With reference to FIGS. 1 and 2, the quick-release device 1 in the loosened position is mounted on a bicycle wheel 2 through a central hub 3 that is part of the wheel. The device axially extends through the hub by means of a rod 4 or tightening shaft, referred to as the "skewer," capable of being received by each fork end of the bicycle, or dropout, which includes an open slot adapted to be supported on the free axle portion. Once each fork end has engaged a free end portion of the skewer, a release system 6 positioned at one of the ends of the skewer is actuated for tightening in order to exert a tension force on the skewer so as to tighten the device against the two fork arms, and thus to fix the wheel in place relative to the fork.

A release device 1 according to a first embodiment is fully shown in FIG. 2. It includes a release system 6 according to the invention, which is mounted on a first end 8a of the skewer 4 and is capable of applying a traction force to the skewer 4 when the device is in operation on the cycle. It includes an end support element 7 mounted on the other end of the skewer. In the embodiment illustrated in FIG. 2, this end support element is a head attached and fixed by wedging or an adhesive, or it is integral with the skewer, or yet an element mounted by means of a threaded nut and a transverse tightening surface 9 arranged on a second end 8b of the skewer. The relative position of the support element can thus be adjusted with respect to the end of the skewer in order to refine the adjustment of the center distance 10 of the skewer. On the opposite side, the release system 6 has a threaded portion and a transverse tightening surface 11 enabling the center distance 10 to be adjusted. The center distance is defined here as the distance separating the two transverse tightening surfaces 9, 11. As is conventional, the device also includes two helical spring portions (not shown) on each end of the skewer, which are in contact with the transverse tightening surfaces whose function is to assist with centering the device during assembly on the cycle. The invention also encompasses other centering systems.

FIGS. 3 to 7 show a first embodiment of the invention, in particular an embodiment of one of the portions of the device, namely, the quick-release system 6 mounted on one of the threaded ends 12 of the skewer. According to the invention, the system 6 is made up of a tightening sub-assembly SES and an actuation sub-assembly SEA which are connected by a disengageable connection interface, as is explained in detail below.

The tightening sub-assembly (SES) includes a flanged central shaft 13 provided with a threaded central bore that extends around the longitudinal rotational axis I extending along the axis of the skewer 4. The central shaft 13 is thus capable of being threadedly engaged with the threaded portion 12 of the skewer. A support washer 14 is mounted around an extension 15 of the central shaft forming a tubular portion. The washer is mounted to rotate freely about the central shaft so as to promote tightening and loosening by reducing friction between the movable shaft and the washer, and to promote the grip of the washer on the receiving portion of the cycle. The outer end of the washer 14 forms the tightening surface 11 of the tightening subassembly (SES). The surface 11 can be provided with corrugations, notches, or a deformable material thickness in order to promote the grip of the washer on the receiving surface of the cycle, for example a fork arm.

The actuation subassembly (SEA) includes a cylindrical body 16 mounted coaxially along axis I, in which the flanged central shaft 13 is housed at least partially. The shaft 13 is thus mounted within the body, with the possibility to slide in the axial direction I, relative to the body during the tightening operation, as is explained below. A sealing mechanism, such as an O-ring 17, can be inserted between the contact surfaces of the shaft and the inner surface of the body 16 so as to prevent the intrusion of particles, such as sand or dirt, which could negatively affect the operation of the device.

The body 16 further includes a first housing 18 demarcated by an annular shoulder 19 and by the disc-shaped base 20, or flange, of the central shaft. A disengaging mechanism in the form of a ratchet 21 is housed in this housing 18. This mechanism takes the form of an annular portion including a lower surface provided with a series of teeth 22 distributed according to a "crown" pattern. The teeth are thus directed toward the upper surface of the base 20 of the shaft, which has a series of teeth 23 also distributed in a "crown" pattern and directed toward the ratchet 21.

Thus, the toothed assembly of the ratchet 21 and of the upper wall of the base 20 of the shaft forms a so-called "disengageable" connection interface according to the invention, whose mode of operation is described in greater detail below.

Figure 5A:
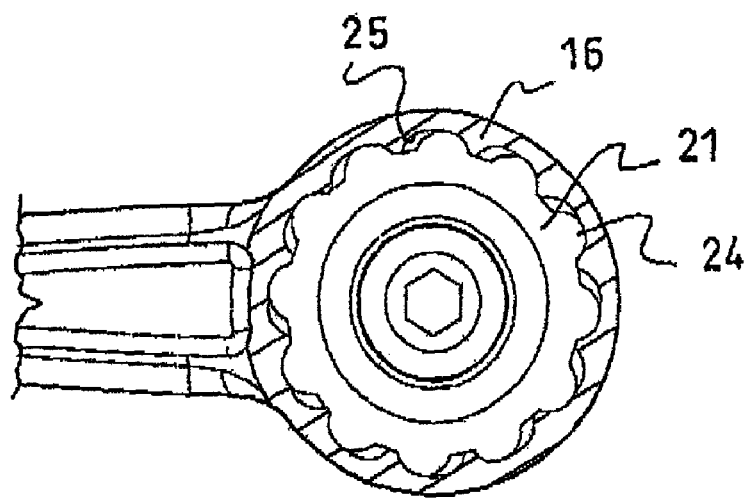
FIG. 5a is a partial cross-sectional view of the first embodiment of the invention.

As shown in FIG. 5, the ratchet has a peripheral surface forming a series of projections 24 which engage a series of inner grooves 25 provided on the cylindrical inner surface of the body 16 of the actuation subassembly (SEA). The assembly with grooves provides a connection ensuring an at least partial affixation in the rotational direction. In other words, the ratchet 21 is partly affixed to the body, except for functional clearances, and is blocked from relative rotation with respect to the body. However, as shown in FIG. 5a, a clearance can be provided between the inner grooves 25 of the cylindrical body 16 and the projections 24 of the ratchet 21 so as to provide a possible angular movement allowing for a certain repositioning in a selected angular position of the lever 37, as described below. For example, the grooves 25 of the body 16 can form cylindrical portions whose diameter is greater than the projections 24 of the ratchet 21, also formed of cylindrical portions. Thus, after each tooth passage, in view of this clearance between the projections 24 and the grooves 25, it is possible to reposition the lever 37 by a certain angular variation, for example, within a range of about 2 to 5 degrees.

The system further includes an elastic tensioning mechanism 26 which, as shown for example in the first embodiment, is housed in a second housing 27 of the actuation sub-assembly (SEA). The housing is demarcated by the annular shoulder 19 and a calibrating element 28, or adjustment mechanism. The elastic tensioning mechanism 26 can have a different configuration. According to one embodiment of the invention, this can be at least one Belleville spring washer, such as a plurality of serially mounted Belleville spring washers 29, 30, 31, 32. The advantage of an elastic mechanism including Belleville spring washers is that it allows for a precise adjustment of the relative displacement path of the disengageable connection interface and, consequently, a precise adjustment of the tightening torque. Alternatively, other elastic tensioning mechanisms, such as an elastomeric block or a helical spring, for example, are possible. The elastic mechanism could also be part of the ratchet by being an integral elastic part of the ratchet and/or part of the body by forming a unitary portion of the body 16.

The compression of the elastic tensioning mechanism, for example, of the washers 29-32, can be obtained by the adjustment mechanism 28 in the form of a threaded ring or nut. Such ring is mounted through the body 16 and includes a shoulder 33 that compresses the washers 29-32. The ring includes a bored central portion 34 provided with a threading 35 that cooperates with a threading 36 of the flanged central shaft 13. Thus, the compression of the elastic mechanism can be adjusted by modifying by screwing the ring insertion depth relative to the central shaft 13. Such an adjustment can be made, for example, at the time of assembly of the system. The stop in position can be achieved by an adjustable washer which blocks the system, for example a spacer or wedge 38' or a stacking of spacers or wedges.

The actuation sub-assembly (SEA) also includes a lever 37 in order to be capable of actuating the system in rotation during tightening and loosening. The lever can be a unitary part of the cylindrical body 16 or an attached element. It extends radially with respect to the device. Other actuating mechanisms are also within the scope of the invention. Thus, one can provide to replace the lever with a button or a knurled wheel that is part of the body 16.

Finally, a wedging mechanism can be provided in order to adjust more finely the tightening torque transmitted by the actuation sub-assembly to the tightening sub-assembly. For example, a set of wedges 38 can be inserted in the housing 27, or between the ratchet 21 and the shoulder 19. The set of wedges can be interchangeable at the time the device is assembled. The wedges 38' can also be positioned in various locations, such as between the upper end of the base 20 and the adjusting nut 28.

The ratchet 21 can be integral with the body of the lever 37 or can be a separate element. The advantage of having two separate elements is that the materials of each element can be selected as best, for example, a lightweight plastic material for the lever and a wear-resistant material, such as metal, for the ratchet; which thus ensures good torque stability.

The operation of the device is next described.

FIG. 3 shows the release system meshed with the skewer in an "engaged" mode corresponding to the schematic view of FIG. 6, i.e., in which the connection interface is configured in close mechanical contact to transmit the tightening torque from the lever 37 to the tightening sub-assembly (SES), which is transferred as an axial tightening force applied by the support washer 14. In this configuration, the elastic tensioning mechanism 26 forces the cylindrical body 16 in compression against ratchet 21, which itself presses against the base 20, or flange, of the shaft 13. There results an engagement of the teeth 22 of the ratchet and the teeth 23 of the shaft. At rest, the system is in this static, and stable, configuration or state. When the tightening torque is applied to the lever 37 by the user, the torque is transmitted to the ratchet because it is rotationally affixed to the body by the assembly with projections and grooves 24, 25. This torque is thus transmitted to the connection interface, i.e., to the assembly of teeth 22, 23. As a result, the central shaft 13 moves rotationally against the threaded portion of the skewer 4 so that the center distance decreases, which produces tightening by the tightening surface against the surface 11 of the cycle to be tightened.

The connection is unstable beyond a certain torque threshold, which produces a partial disengagement of the teeth 22, 23. In other words, a "disengaging" results in the limit of the axial force. FIGS. 6 and 7 clearly show the switch from the engaged state to the disengaged state, i.e., from a stable state to an unstable state, according to the invention. When the torque reaches a threshold value, the connection gear is biased torsionally, thus causing the ratchet to disengage and rise, and the elastic mechanism to compress. The ratchet 21 rises and returns to its position upon each tooth passage. The adjustment force and the stiffness of the elastic mechanism determine the threshold value (or range of values) of the torque which causes the disengagement by a raising of the ratchet, followed by its return to position after each tooth passage.

The shape and the angle of the teeth also determine the threshold value of the disengaging torque. The configuration of the teeth can be asymmetrical. More particularly, in the tightening direction C, the angle A1 of the front surface 86 of the ratchet teeth relative to the axis I is greater than the angle A2 of the rear surface 87 of the ratchet teeth.

FIG. 5b shows a tooth profile according to the invention. The relationship between the axial force "Fa" and the angle A1 is expressed as follows:

$$Fa = (C/Rmy) \times tg(A1 - \phi)$$

where C is the transmitted torque;

Rmy is the mean radius of the teeth relative to the axis I of the device; and $\phi$ is the angle of friction of the material.

The tangential force $F\tau = C/Rmy$ is directly determined by the torque and the mean radius:

$$F\tau = C/Rmy$$

If the angle A1 is too small, the influence of friction is substantial, and thus the release torque becomes too sensitive to the conditions of friction (lubrication, seizing, etc.). If A1 is smaller than the angle of friction $\phi$, no disengaging occurs, and the system is blocked. If A1 is equal to 90 degrees, only friction occurs. Therefore, a very high axial force Fa is necessary, and the release or disengagement is not precise.

In seeking the most stable torque possible, an intermediate angle range must be found in which the torque to be applied is not overly influenced by the friction conditions, on the one hand, and is not blocked, on the other hand.

The material of the teeth must be selected so that the coefficient of friction remains as constant as possible over time in order to obtain a torque as stable as possible.

According to a specific embodiment, the angle A1 is about 25 to 40 degrees or, according to a more specific embodiment, the angle A1 is about 32 to 33 degrees. The teeth 23 of the base 20, or flange, are, in a particular embodiment, complementary to the shape of the teeth of the ratchet 21. Due to the dissymmetry and, in particular, to the angle of the front surface, the more the latter increases, the more the disengaging intervenes with a high torque value and conversely. If the angle is too large, the system is unable to disengage, and the tightening is then that of a conventional tightening system which depends upon the physical strength of the user. The same phenomenon can occur if the stiffness of the elastic mechanism is adjusted to be too great. In a particular embodiment, the teeth have a shape of evolution, in particular the shape of a helical cam; such helical cam can have a constant pitch. In other words, the tooth does not have a constant angle but rather a helix-shaped evolving angle forming a larger contact surfaces between the teeth.

Thus, the system disengages beyond a threshold of the tightening torque, so that the lever 37 and the body 16, which are affixed to one another, drive the ratchet rotationally. The ratchet 21 rises relative to the toothed surface of the shaft by creating a variation "e" (FIG. 7). When the lever continues its rotation, the teeth 22 of the ring gear of the ratchet 21 rub against the teeth 23 of the ring gear of the shaft 20 of the tightening sub-assembly. The friction upon passage of the teeth, caused by the relative rotational displacement of the ratchet 21 with respect to the shaft 13, provides a useful audio indication for the user, who is then warned that optimal tightening has been achieved. The position of the lever can be adjusted to any angular position selected by the user, without the tightening force being thereby modified for that. Thus, the lever can be repositioned in order to reduce the risks of hooking by continuing the rotation of the lever in the tightening direction until reaching the selected final position.

In the loosening direction, the lever is actuated counter-clockwise (direction D). In this direction, the selected angle A2 of the teeth of the ratchet and shaft are smaller than in the tightening direction, so that the release can take place at the tightening value without risk of disengaging. An angle A2 ranging between approximately 27 to 28 degrees yields satisfactory results. For example, a difference in angle between the two surfaces of the teeth is between 0 and 7 degrees and, in a particular specific embodiment, approximately 5 degrees.

For the manufacture, the asymmetry of the teeth 22,23 of the ring gears can be achieved by milling, using a tilted milling cutter having milling angles of approximately 50-70 degrees. For the ratchet, its radial grooves can be obtained by sintering of metal powder or molding (lost wax) or by striking. The material of the ratchet can be metal or steel, aluminum or Zamac®, or molded plastic.

Figure 8:
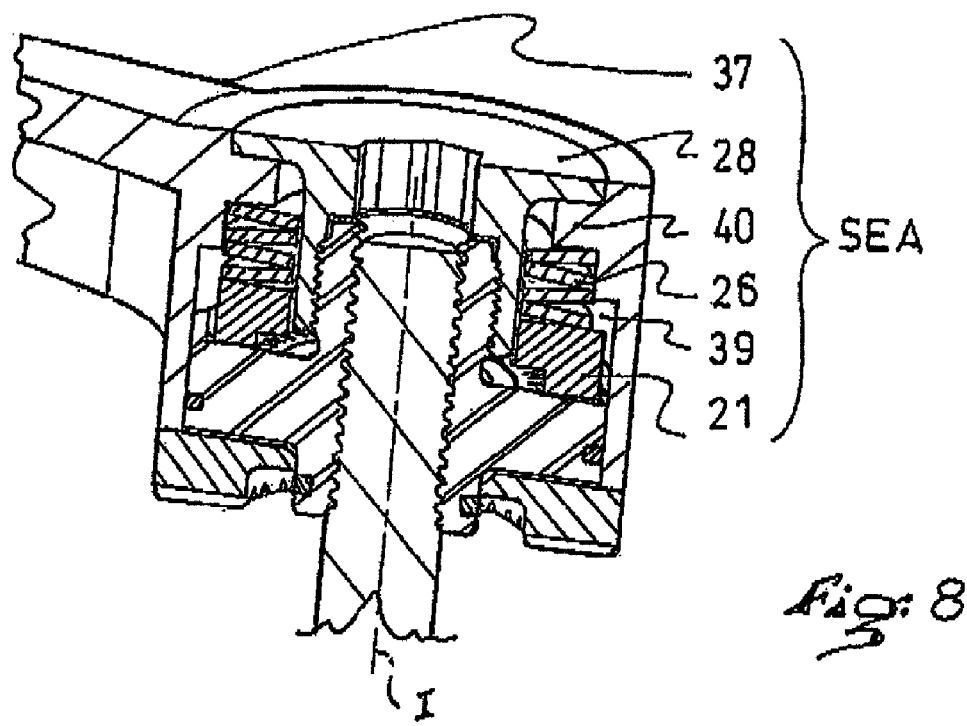
FIG. 8 is a cross-sectional view of the quick-release system of the device in the engaged mode according to a second embodiment.
Figure 9:
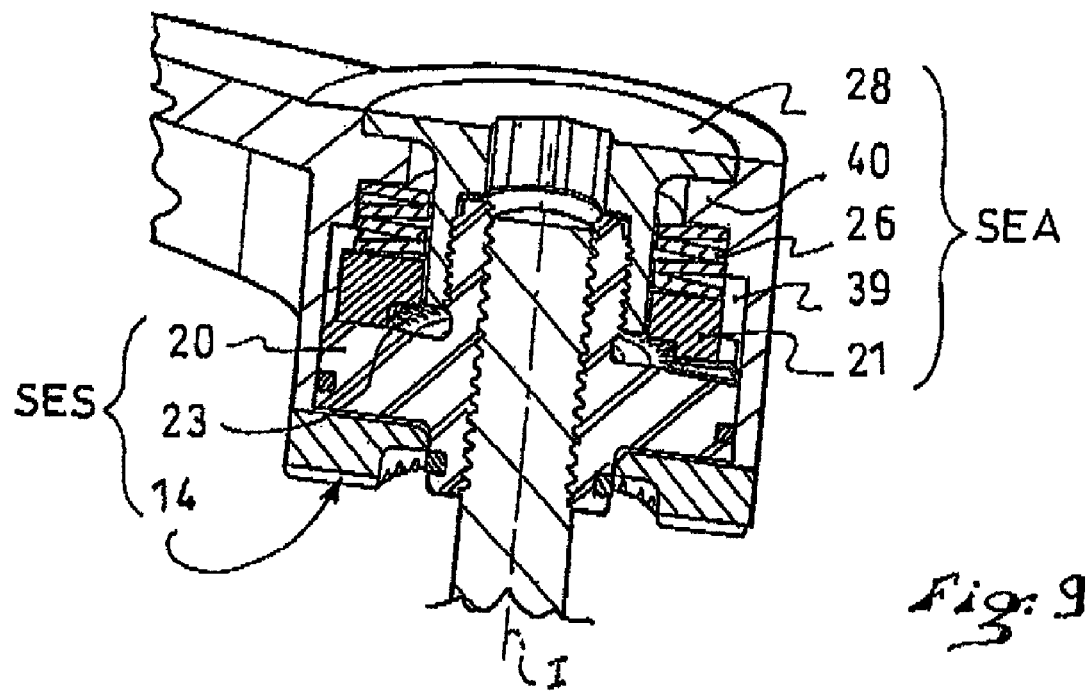
FIG. 9 is a cross-sectional view of the mode of FIG. 8, but in the disengaged mode.

FIGS. 8 and 9 illustrate a second embodiment of the invention. Compared to the first embodiment, the same reference numerals are used to designate the same elements. The only difference lies in the actuation sub-assembly (SEA) and, more precisely, in the position of the elastic tensioning mechanism 26, which is located in a housing 39 demarcated directly between the ratchet 21 and a shoulder 40 of the lever body. In this embodiment, the ratchet is not directly affixed to the body but preserves its axial mobility relative to the body, which enables it to rise during disengaging.

The teeth of the disengaging mechanism can be replaced by other friction arrangements, such as balls, conical holes, or cylinders, for example.

Figure 11:
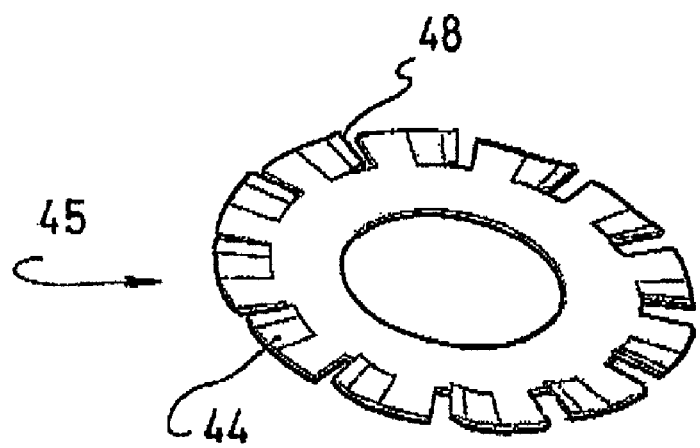
FIG. 11 shows an element of the system of FIG. 10.
Figure 10:
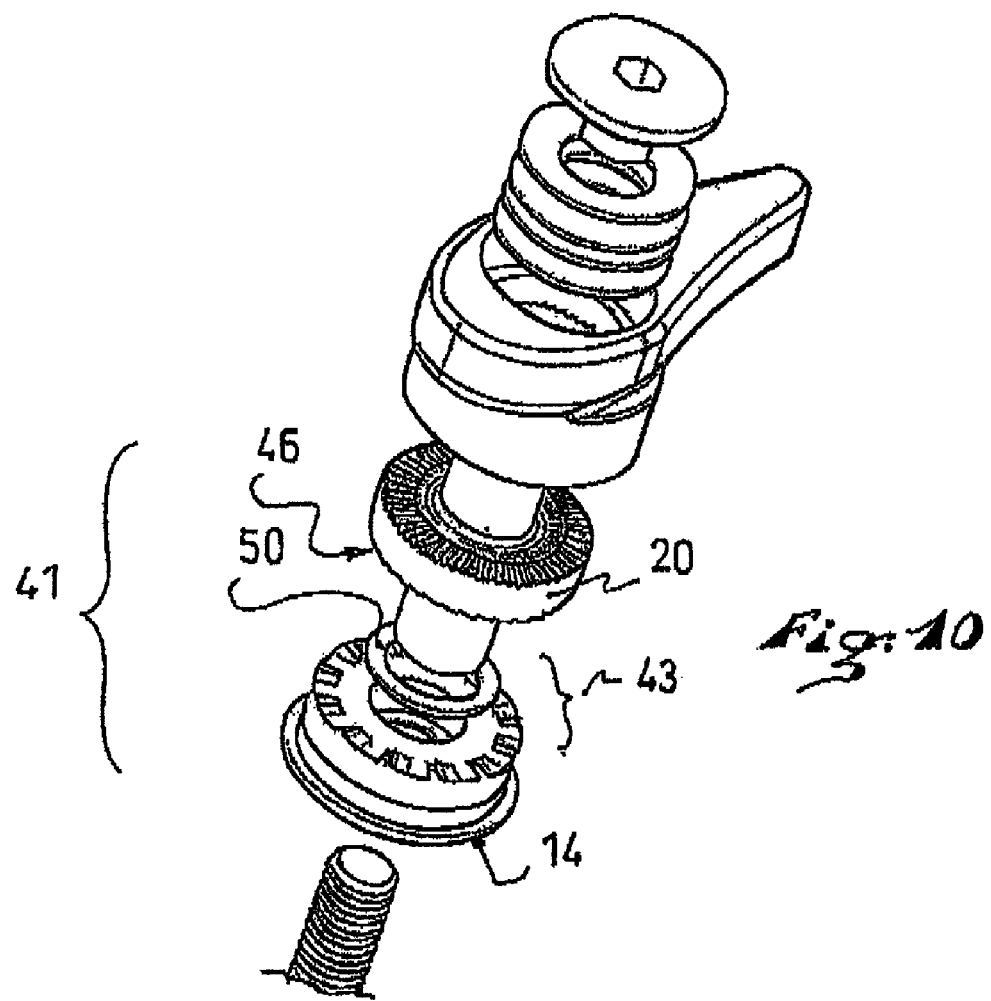
FIG. 10 is an exploded view of the quick-release system of the device in the engaged mode according to a third embodiment.

FIGS. 10, 11, and 12 illustrate a third embodiment of the invention. A primary improvement with respect to the first embodiment comes from the integration of an interface 41 for the friction differential between the tightening-loosening modes.

Indeed, when the user tightens the blocking, the torque that he/she exerts on the lever breaks down into one fraction, approximately 50%, transferred from the nut to the support washer, and the other fraction, therefore approximately 50%, transferred in the skewer by the screw/nut helical connection. For loosening, the user must exert a slightly lower torque compared to tightening. Otherwise, exactly the same torque would be found in the area of the support washer, and a lower torque would be found in the area of the screw/nut connection. The friction torque between the nut and the support washer has a negative effect during tightening because it reduces the effectiveness of tightening by the user; however, it has a beneficial effect during loosening that prevents the blocking from loosening on its own.

In order to improve the blocking effectiveness while avoiding an ill-timed loosening, the mechanism operates on the principle that the tightening function promotes slipping between the nut and the support washer, whereas the loosening function generates friction there. As a result, there is an increase in the torque necessary for loosening, compared to the torque necessary for tightening. One advantage is to ensure more safety in the loosening direction and to comply with the standards in force for blocking devices in the field of cycles while improving the tightening effectiveness.

To this end, the interface 41 is a "freewheel" or unidirectional friction interface including selective retaining mechanism 43 dependent upon the direction of rotation of the actuation sub-assembly. In particular, the selective retaining mechanism include a series of radial blades 44 of a freewheel slip ring 45, which cooperate in the retention (in the loosening direction) of the ring, with notches 46 formed on the lower surface of the body of the shaft 20. The blades have raised edges 48 which come into abutment on teeth 49 of the notches when the body is actuated in the loosening direction D by the lever. Consequently, the freewheel ring 45 is driven rotationally. Rotating the ring 45 generates friction at the interface between the ring and the inner surface of the support washer 14, due to the relative movement between these two elements.

In the tightening direction C, the teeth 49 of the shaft 20 pass beyond the raised edges and, consequently, the body does not drive the freewheel ring rotationally. The ring thus remains in position relative to the support washer 14 during the displacement of the lever body. In order to limit friction between the rotationally driven base of the central shaft 13 and the fixed slip ring, a sliding washer 50 made of a material having low coefficient of friction must be inserted between the shaft and the ring.

For example, the washer 50 has a smaller diameter than the slip ring 45 in order to reduce friction to the maximum. The washer is made of a material such as pure PTFE or a material loaded with PTFE. The washer could be omitted in the interface. The interface washer 45 can include an upper surface made of a material having a low coefficient of friction and a lower layer made of a material with a higher coefficient of friction, such as a metal, such as steel, for example. In one particular alternative, the washer is replaced by a sliding varnish on the surface of the freewheel ring.

By way of a numerical example, the washer has an outer diameter of 11 mm and an inner diameter of 9 mm, that is to say a mean radius of 5 mm. The torque of the materials of the washer 50 and the nut 20 has a coefficient of friction "f" of approximately 0.05. The freewheel ring has a diameter of 11 mm and an inner diameter of 9 mm, that is to say a mean radius "Rmy" of 6 mm. The material torque between the freewheel ring 45 and the tightening ring 14 has a coefficient of friction of 0.14.

For an axial force Fa of 6000 Newtons the torque applied between the nut and the support washer during tightening is obtained by the formula:

$$C = Rmy \cdot Fa \cdot f$$

Consequently, in the tightening direction, the torque necessary for tightening is about $Cs = 0.05 \times 5 \times 6000/1000$, that is to say 1.5 Newton-meters.

In the loosening direction, the freewheel ring is driven rotationally and the torque necessary for loosening is about $C = 0.14 \times 6 \times 6000/1000$, that is to say 5 Newton-meters.

It is thus noted, in the numerical example given, that the torque between the nut and the support surface, necessary for loosening, is approximately 3.4 times higher for loosening than the torque necessary for tightening.

According to another aspect of the invention, the tightening efficiency can be improved by providing the skewer shaft with a threading having a larger pitch, in order to increase the advance during tightening. Indeed, while observing friction of a screw/nut connection, it is noted that efficiency is quite low, and that doubling the threading pitch, for example, makes it possible to divide by 2 the angle necessary for tightening, but only very slightly increases the torque. Thus, on a M5×0.8 threading normally used on quick-release devices for cycles, it is necessary to have a torque of 3 Nm in the threading in order to tighten a force of 6000 N; if the pitch is doubled to 1.6 mm, the torque then increases from 3 to 3.8 Nm, that is to say +26%, whereas the angular distance is divided by half; thus, by doubling the pitch, the energy necessary for tightening has been reduced to $(3.8/3) \times (\frac{1}{2}) = 63\%$ of the initial value, which thus produces an 37% improvement to the tightening effectiveness.

This type of threading improves the tightening effectiveness, but also results in reducing the loosening torque and therefore degrades blocking safety, as opposed to unscrewing. In a particular embodiment, this type of construction with large-pitch threading must be used with a differential friction system similar to the preceding description.

Another improvement to increase the tightening effectiveness involves reducing the coefficient of friction at the screw/nut interface by treating the nut and/or screw thread using a sliding varnish, for example. Thus, the use of a PTFE-based sliding varnish on the aforementioned M5×1.6 threading (with double thread) makes it possible to reduce the torque to tighten a force of 6000 N from 3.8 Nm (untreated) to 2.5 Nm (treated PTFE), that is to say −35%, and to bring the torque back down to a lower value than a standard M5×0.8 threading which requires 3 Nm (untreated).

Thus, an advantageous embodiment is to superimpose these two improvements (large pitch and sliding varnish) to optimize the effectiveness, and to add the friction differential system thereto in order to avoid any risk of loosening.

Figure 21:
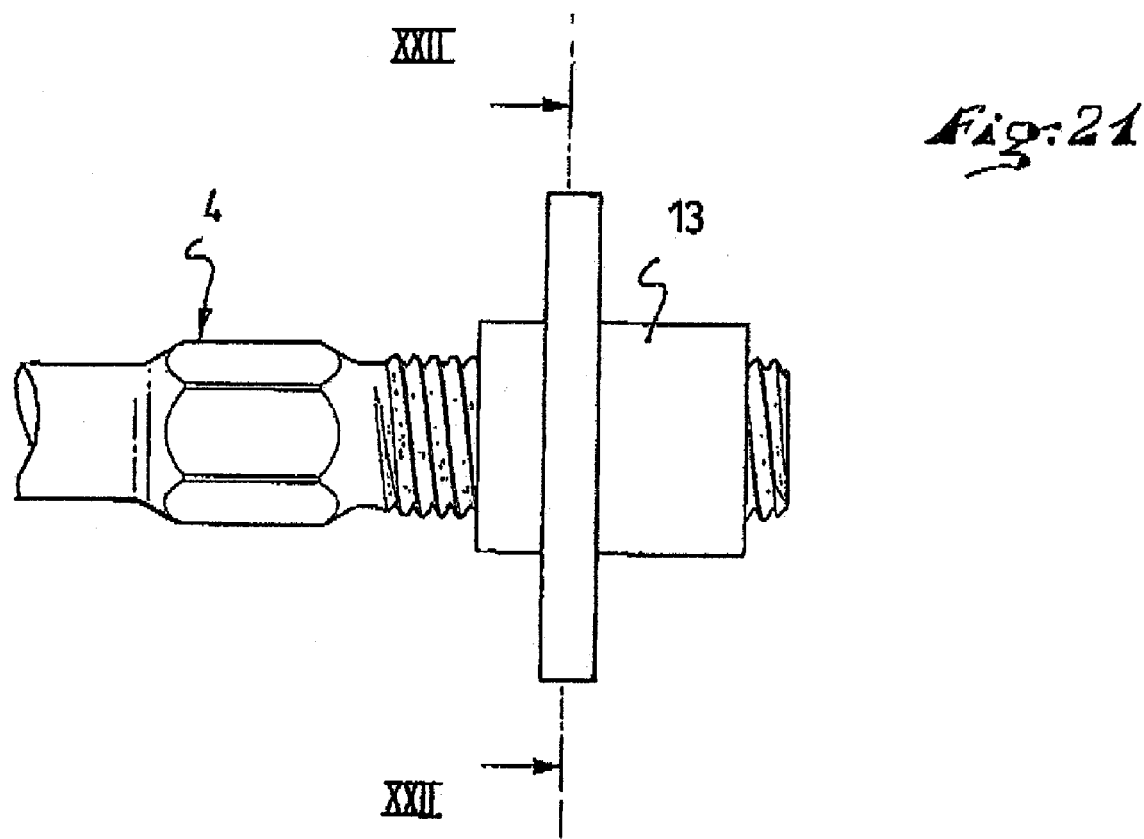
FIG. 21 is a partial view of the skewer rod and the nut.
Figure 22:
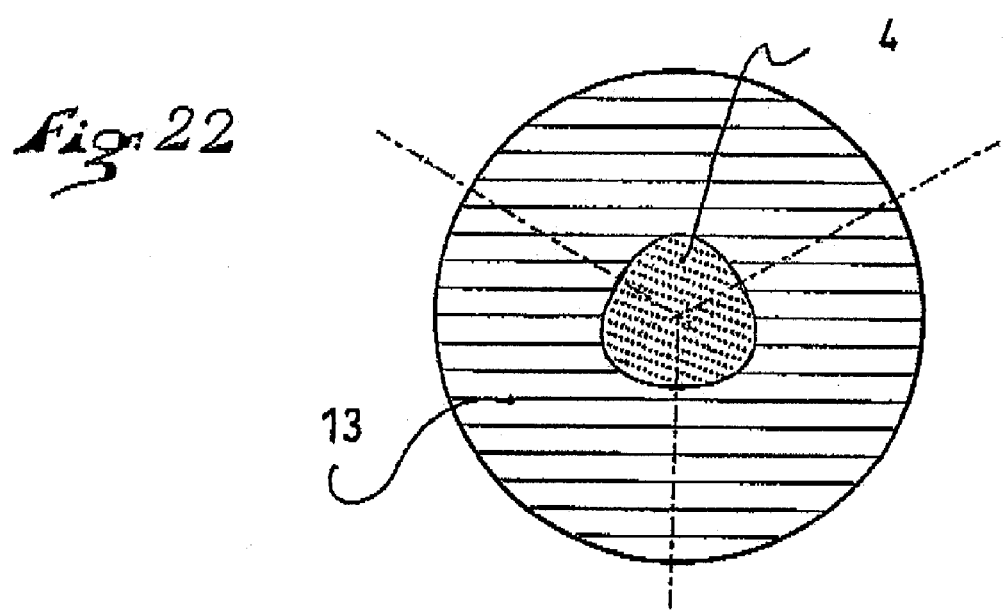
FIG. 22 is a cross-sectional view of FIG. 21.

FIGS. 21 and 22 illustrate an alternative embodiment which includes a skewer 4, the threaded portion of which has a large pitch. For reasons of simplicity of the description, only the skewer 4 and the shaft 13 are shown here. This alternative could be implemented in all the embodiments of the invention described herein. The threaded portion of the skewer 4 and that of the shaft 13 are of the M6 type, with a pitch of 2.1 mm, and include three threads with a depth of 0.7 mm. A large-pitch screw thus ensures greater efficiency. The use of a plurality of threads further improves the mechanical strength of the screw.

In this exemplary case, a release torque of 5 Nm is sufficient to produce a traction force of 6000 N in the skewer.

In the exemplary case illustrated in FIGS. 2 to 7, i.e., which does not have the friction differential interface, a release torque of 8 Nm is sufficient to ensure that the wheel will be maintained in the fork with a tightening force of 6000 N.

Such an interface with "freewheel" effect makes it possible to improve the tightening efficiency and guarantees safety to prevent ill-timed loosening by imposing a higher loosening torque during on loosening compared to the tightening torque. Such an interface can apply to any type of axle tightening device for a cycle, between a support washer and a tightening member and is not limited to the device according to the invention.

Another embodiment of the invention is illustrated in FIGS. 13 to 17. This embodiment features a principle using a pawl that enables tightening by a "pumping" effect and disengagement of the pawl beyond a certain tightening torque threshold.

The device includes a release system 6 including a body 57 that is extended by a lever 77, which has a central slot 68 in which a double pawl 51 and an elastic tensioning mechanism 60 are housed.

The disengageable connection interface is thus formed by the double pawl 51 with two positions of stability forming, with the elastic mechanism 60, a knuckle joint. The pawl is adapted to engage at least one toothed portion 52, for example, a toothed wheel, affixed to the tightening sub-assembly.

The tightening subassembly thus includes a toothed wheel associated with a tightening washer 69 having notches 70 that promote friction against the cycle portion to be tightened (a fork, for example). The tightening washer is mounted to rotate freely with respect to the toothed wheel 52. Another internal washer (not shown) made of a material with low coefficient of friction can be arranged between the washer 69 and the toothed wheel in order to improve the tightening efficiency.

The toothed wheel 52 has a central cylindrical bore 76 provided with a threading for the end of the skewer to be inserted and screwed.

The double pawl includes a first pawl portion 53 and a second pawl portion 54, the two portions being opposite and forming a sort of fork. Each pawl portion includes a tooth 55, 56 with an asymmetrical profile, which is adapted to engage the toothed portion 52 in the engagement mode. The toothed wheel, for example, has a symmetrical tooth profile, i.e., it has the same angle in the tightening direction as well as in the loosening direction.

The double pawl is thus rotationally assembled on the body 57 of the device, which extends via the lever 77 by a first rotational point 58. The double pawl includes a rear portion 59 that connects to an elastic mechanism 60, such as a spring wire. The spring wire includes two wire arms 61 62, or blades, connected by a rotational point 63 on the double pawl, on the one hand, and by a rotational point 64 at the rear of lever 77, on the other hand. As result from this assembly, a knuckle joint is formed by three. rotational points 58, 63, 64, thus creating a pawl having a "bi-stable" effect, with two positions of stability corresponding to each alternative engagement position of each pawl portion 53, 54 opposite one another on the toothed wheel 52.

Figure 14:
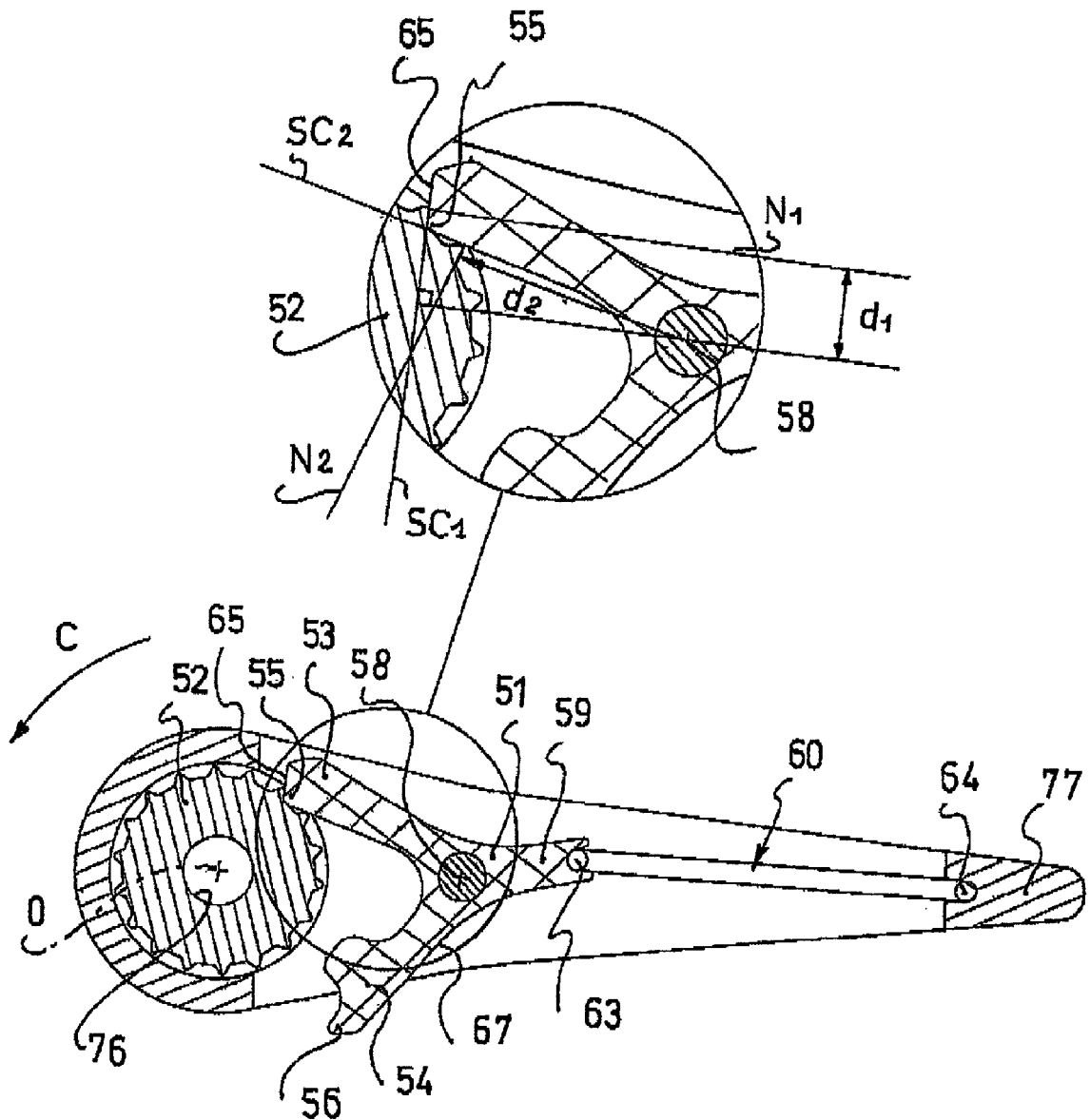
FIG. 14 is a cross-sectional view, along the line A-A, of the system of FIG. 13 in the tightening position.

The asymmetrical configuration of the teeth of the pawl portions 53, 54 and the symmetrical configuration of the teeth of the toothed wheel 52 make it possible to manage the pawl effect in the tightening position as well as in the loosening position. More specifically, FIG. 14 shows a first tightening position of the pawl in which the first pawl portion 53 engages the toothed wheel, thus making it possible to tighten the device by screwing the skewer in the wheel, when the lever is actuated in the rotational direction C. The tooth 55 of the engaged pawl portion forms an engagement front surface 65.

The system is disengageable starting from a certain tightening torque. In this case, the pawl portion 51 rises upon contact with the tooth of the toothed wheel due to the force exerted by the spring.

To set the device in the tightening position, it is necessary to first press on the first pawl portion 53 to ensure that the double pawl 51 is in the stable position described in FIG. 14. In this position, the tooth 55 of the first pawl portion 53 engages the front surface 65 of the tooth of the toothed wheel 52. Thus, the rotation of the lever in the direction C drives the toothed wheel 52 in the same direction. However the reaction on the front surface 65 of the tooth of the toothed wheel 52 tends to cause the double pawl to rock in the opposite direction, against the action of the spring wire 60 of the knuckle joint. As long as the moment of this reaction on the axis 58 is lower than the pre-stressing moment of the wire spring 60, the device does not disengage. The disengaging occurs when the reaction moment on the front surface 65 exceeds the pre-stressing force moment. It is the pre-stressing of the wire spring 60 that determines the release torque threshold.

In this configuration and in the tightening direction C, the frontal reaction of the tooth passes very close to the rotational axis 58 of the pawl (distance d1), which makes it possible to have a high-level release. The distance d1 is determined as being the distance separating the axis 58 from the normal line N1 at the contact surface SC1, between the pawl 51 and the toothed wheel 52.

At the time of release, the unstable state shown in FIG. 15 resumes. The first pawl portion remains in contact with the toothed wheel 52, but it slides on the surface thereof. Consequently, in this state, the rotation of the lever, and that of the pawl, does not cause a rotation of the toothed wheel 52.

In this state, if the user continues to apply the same force to turn the lever 77, the phenomenon described hereinabove is repeated, namely the engagement of the pawl on a tooth of the toothed wheel 52, then the sliding thereof on the toothed wheel until it comes into contact with the next tooth. This succession of engagement and sliding generates a characteristic "rattling" noise which informs the user that the maximum tightening torque has been reached.

During tightening, the user can make use of the "pump" phenomenon during which, while maintaining the first pawl portion 53 in the tightening position, i.e., in contact with the toothed wheel 52, the lever 77 is caused to pivot in the loosening direction D. When the lever is turned in this direction, the preceding tooth of the toothed wheel 52 comes and lifts the first pawl portion 53 against the wire spring 60. In this confirmation of contact between the pawl and the toothed wheel 52, the contact surface SC2 is directed much differently than it was in the tightening direction and one can note that the distance d2, separating the normal line N2 from the axis 58 at the contact surface SC2 (at the contact point) is much greater than d1, so that the required force for disengaging in the loosening direction is much lower. It is an important condition in allowing a "pumping" phenomenon and the functioning of the system such as a "freewheel" ensuring the transmission of a torque to the toothed wheel 52, only in the tightening direction.

This freewheel effect can be further improved by providing a pre-stressed secondary pawl which would replace the first pawl portion 53.

The loosening position is shown in FIG. 16. This position is obtained by rocking the double pawl around its rotational point 58. The rocking is obtained by pushing back the pawl, for example, by manually pressing on the support surface 67 of the pawl. The pawl is thus set in the loosening position. The second pawl portion 54 is asymmetrical, in the same manner as the first pawl portion. Due to the reversed engagement of the second pawl portion 54 with the wheel, by rotating the pawl in the direction D, one blocks the tooth of the pawl portion on the toothed wheel and thus unscrews the skewer in relation to the toothed wheel and, consequently, loosens the device. Similarly, by operating the pawl in the direction C, one obtains the friction of the pawl portion on the wheel. Consequently, by operating alternatively in the directions C and D, one obtains a pump effect during loosening.

Figure 18:
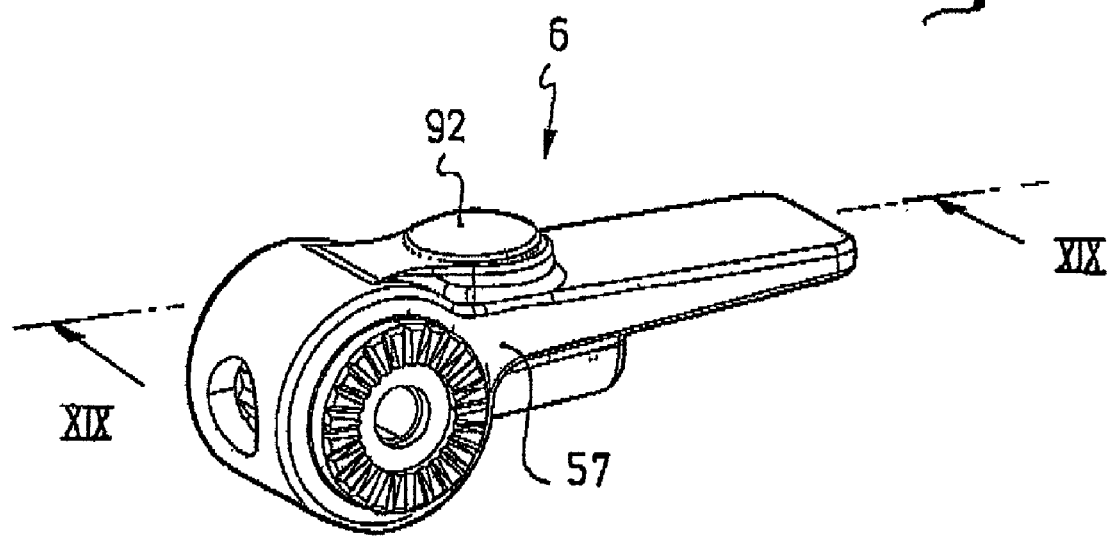
FIG. 18 is a perspective view of a quick-release system according to a fifth embodiment.
Figure 19:
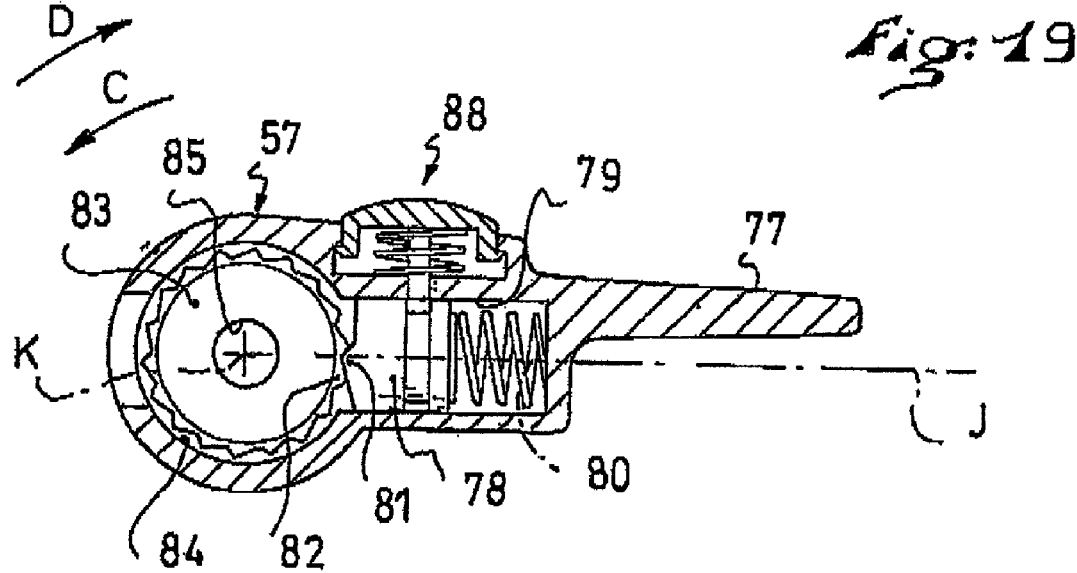
FIG. 19 is a cross-sectional view, along the line B-B, of the embodiment of FIG. 18.
Figure 20:
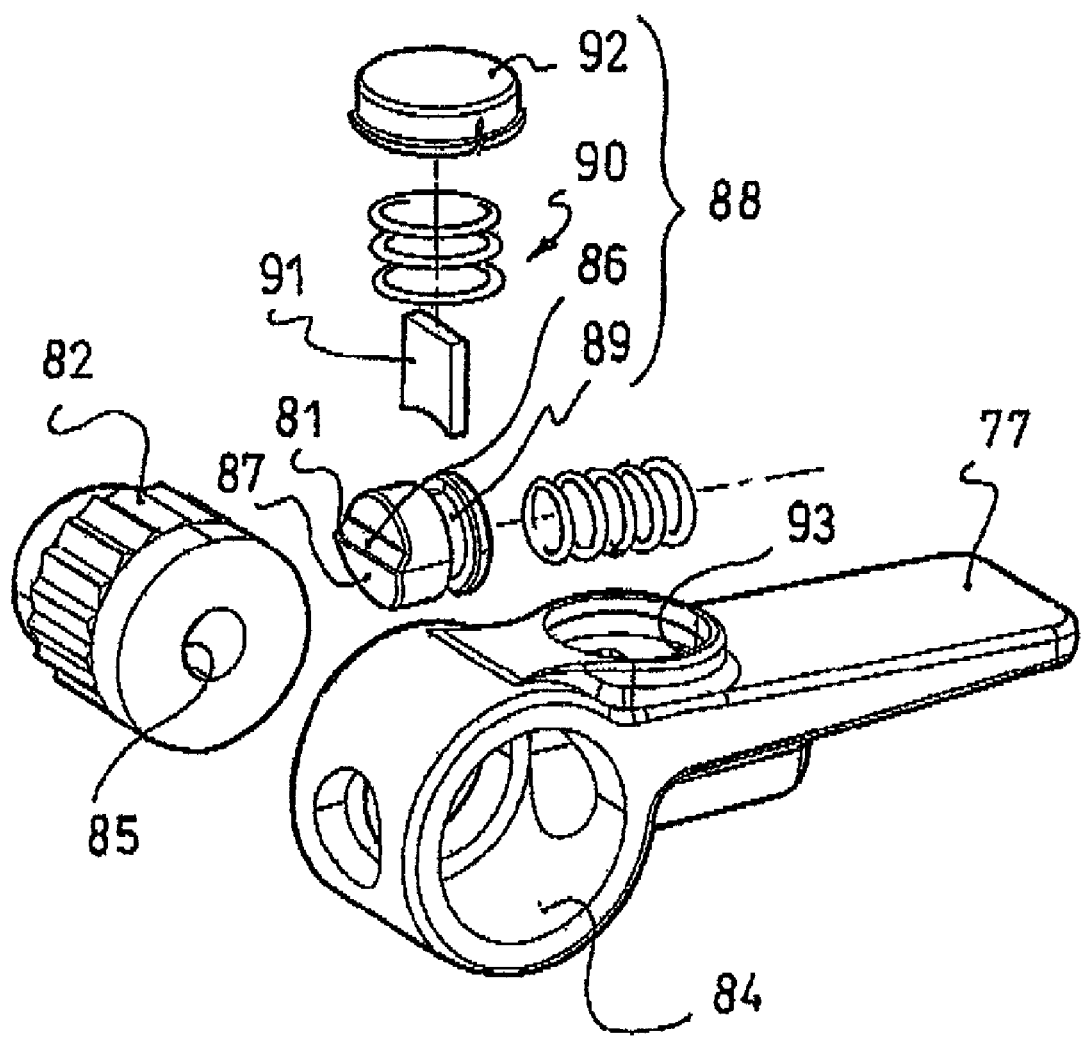
FIG. 20 is a perspective, exploded view of the embodiment of FIG. 18.

FIGS. 18 to 20 show a fifth embodiment of the invention. In this case, the quick-release system 6 illustrated includes a body 57 extended by a lever 77. The system includes a single pawl 78 with axial displacement housed in a cylindrical housing 79 arranged inside the body 57 and one toothed wheel 83 having a rotational axis K. The pawl is movable along an axis J in the housing, perpendicular to the axis K of the toothed wheel. An elastic tensioning mechanism, such as a compression spring 80, is arranged at the rear of the housing to maintain the pawl under tension against the toothed wheel.

The pawl 78 has teeth 81, which cooperate with teeth 82 of a toothed portion of a wheel 83, which is housed in a second housing 84 having a transverse axis K. The wheel 83 has an axial bore 85, in which a threading (not shown) is arranged to receive the threaded end of the skewer.

The toothed portions 81, 82 of the pawl and of the wheel in engagement with one another are, for example, dissymmetrical in order to oppose more substantial friction forces in the tightening direction C and to promote the partial return of the lever in the reverse direction D in order to provide the advantageous "pumping" effect during tightening. As in the preceding modes, the angle of the front surface 86 of the teeth of the pawl is smaller in relation to the axial plane than the angle of the secondary surface 87.

As shown in the exploded view of FIG. 20, a locking mechanism 88 of the pawl is provided to lock the pawl in the loosened mode. This locking mechanism includes a groove 89 arranged in the body of the pawl, on the one hand, and a transversely movable locking member 90 including a lock 91 and a pushbutton 92 mounted through a transverse housing 93 of the body, on the other hand. The pushbutton makes it possible to move the lock 91 transversely for selectively locking the pawl in the position of engagement with the wheel. In this configuration, the compression spring is no longer active on the pawl. The pushbutton can be elastically movable and can itself be locked in the locking position. The mechanism can be unlocked in the high unlocking position by applying a second thrust on the button in order to release the pawl and to return to the tightening mode, with the pawl being compressed by the compression spring.

In the locking mode by the locking mechanism 88, it is thus possible to actuate the quick-release system in the rotational direction D by blocking the pawl in the engagement configuration. In this case, the lever must be moved rotationally for several turns in order to obtain the loosening. In this case, the system does not involve a "pumping" effect during loosening. Only tightening provides the "pump" effect with partial angular return of the lever without loosening.

According to one advantage of the invention, the tightening force can be better calibrated. In particular, the tightening force can be adjusted to values that are normally lower than the values corresponding to an exaggerated tightening action on a prior art device. In other words, the skewer of the quick-release device on which the system of the invention is mounted does not necessarily need to be oversized or to be made of a metal alloy having excessively high mechanical characteristics. For example, the skewer can be made of an aluminum alloy of the 7075, 7349, or 7449 type, whose mechanical strength is less than or equal to 700 Ma, comprising at least 4% of Zn and 2% of Cu. In the prior art devices, it is preferable to provide a skewer whose mechanical strength in traction is at least 1000 Mpa, such as a skewer made of a TA6V alloy, for example. An alloy of this type has the disadvantage of being much more expensive than the aforementioned aluminum alloys and of not having as good a machinability.

EXAMPLE

The following table shows a comparison of the characteristics of various types of possible skewers for the device of the invention, which are manufactured using various materials: high strength steel (HR), standard steel, TA6V titanium alloy, 7349 aluminum alloy 7349, 7349 aluminum alloy with higher strength and magnesium alloy.

The values are given for a skewer that can resist a maximal traction force F of 10000 Newtons.

| | Max. F 10000 | | | | | |
|---|---|---|---|---|---|---|
| | HS Steel | Steel | TA-6V | 7075 | 7349 | MgAl8Zn |
| Rm | 1400 | 900 | 980 | 500 | 700 | 340 |
| Density | 7.8 | 7.8 | 4.55 | 2.8 | 2.8 | 1.8 |
| Rm/d | 179.49 | 115.38 | 215.38 | 178.57 | 250 | 188.89 |
| Cross section (mm$^2$) | 7.14 | 11.11 | 10.20 | 20 | 14.29 | 29.41 |
| Diameter (mm) | 3.02 | 3.76 | 3.60 | 5.05 | 4.26 | 6.12 |
| Mass/m | 55.71 | 86.67 | 46.43 | 56 | 40 | 52.94 |
| Mass/7349 | 139% | 217% | 116% | 140% | 100% | 132% |
| Cost/kg | 1 € | 1 € | 40 € | 6 € | 8 € | 15 € |
| Machinability | 0 | 0 | -- | ++ | + | |

The table shows that aluminum alloys represent an advantageous compromise in terms of low weight, low cost, and good machinability. Other types of skewers can be used in the invention, with certain disadvantages however associated with weight, cost, or machinability, compared to aluminum-based alloys.

By way of example, the table is provided for a traction force of 10000 N. A traction force of 6000 NR in the skewer can be sufficient to tighten the wheel. It is however necessary to take a safety coefficient in order to take into account dispersions, in particular dispersions related to friction.

A channel provided for the passage of the skewer 4 extends right through the hub 3. The skewer 4 has a generally cylindrical shape completed by a hexagonally shaped portion. The opening of the channel arranged in the hub 3 has a hexagonally shaped cross section that is complementary to that of the portion of the skewer 4.

The hexagonal shape is only one possibility, among other forms, polygonal or the like. For example, a mere flat portion can serve as a means for recovering the torsional forces.

Advantageously, due to the arrangement for recovering the torsional forces, which are positioned in the vicinity of the actuation sub-assembly (SEA), it is not necessary to size the skewer 4 to resist, over its entire length, the torsional stresses that are generated during the actuation of the (SEA).

In another embodiment of the invention, the skewer has a generally cylindrical shape completed by a polygon-shaped portion, such as hexagonal, for example. This embodiment is shown in FIGS. 23 and 24.

Figure 23:
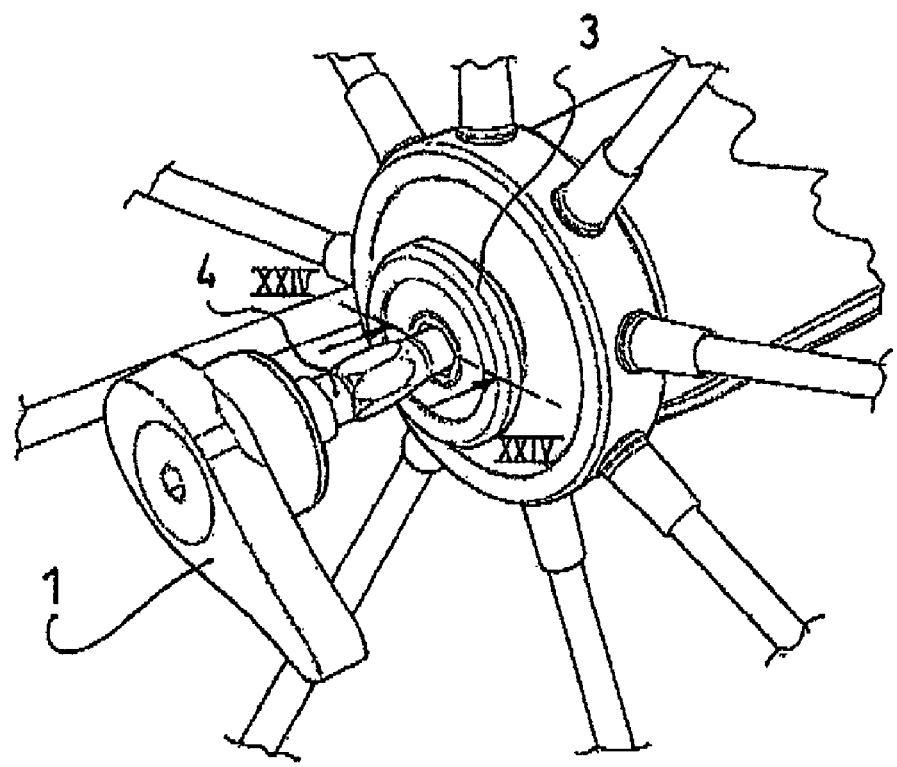
FIG. 23 is a perspective view partially illustrating the wheel and the blocking.
Figure 24:
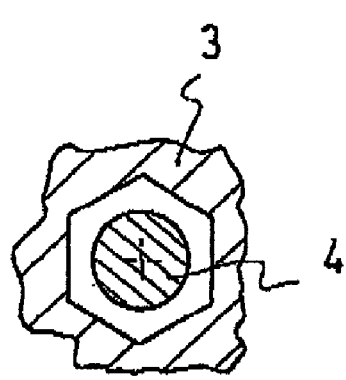
FIG. 24 is a partial cross-sectional view of the embodiment shown in FIG. 23.

FIG. 23 shows a perspective view the hub 3 of a bicycle wheel, as well as the quick-release device 1 before the latter is completely inserted in the hub.

The quick-release device is a device that is consistent with the embodiment shown in FIGS. 1 to 7. This choice is not restrictive and any quick-release device using the screw/nut principle could be improved by the use of this embodiment of the invention. In particular, the quick-release devices which do not include a torque limiting arrangement, or the devices which have a friction differential interface.

The invention claimed is:

1. A quick-release system for a quick-release device for a cycle, such device including a skewer extending in an axial direction and an end support element mounted at a first end of the skewer adapted to be supported by a first tightening support surface of the cycle, said quick-release system comprising:
a tightening sub-assembly including a rotatable member and a support surface, the support surface being configured and arranged to be supported by a second support surface of the cycle;
an actuation sub-assembly including a movable actuating mechanism, capable of axial rotation around said skewer, and configured and arranged to transmit a tightening torque to the rotatable member of the tightening sub-assembly when the device is being tightened;
a tightening torque limiting mechanism to limit torque transmitted by the actuation sub-assembly to the tightening sub-assembly;
said tightening torque limiting mechanism forming a disengageable connection interface configured and arranged to limit torque transmitted by the actuation sub-assembly to the tightening sub-assembly to a limiting value of the torque or to a predefined range of tightening torque values;
said disengageable connection interface comprising respective mutually engageable surfaces of the tightening sub-assembly and the actuation sub-assembly.

2. A system according to claim 1, further comprising:
a mechanism for mounting the system on the skewer of the device, including a threaded portion of the tightening sub-assembly configured to engage the end of the skewer by via a threaded connection.

3. A system according to claim 2, wherein:
the disengageable connection interface is formed by engagement of friction portions on each respective mutually engageable surface of the tightening sub-assembly and the actuation sub-assembly, disengagement of said friction portions beginning from a limiting torque value or from a predefined range of tightening torque values;
said quick-release system further comprising an elastic tensioning mechanism, the two friction portions disengaging against the elastic tensioning mechanism configured and arranged to apply an elastic force of the actuation sub-assembly against the tightening sub-assembly.

4. A system according to claim 3, wherein:
the friction portions of the disengageable connection interface include mutually engageable toothed portions.

5. A system according to claim 3, wherein:
the elastic tensioning mechanism is configured and arranged to apply an axial force of the actuation sub-assembly against the tightening sub-assembly, so that the disengageable connection interface disengages via a relative axial displacement between the friction portions and against tension of the elastic tensioning mechanism.

6. A system according to claim 5, wherein:
the friction portions of the disengageable connection interface include mutually engageable toothed portions;
the toothed portions of the disengageable connection interface are formed by a ratchet including a ring gear; and
the elastic tensioning mechanism is positioned in a cavity between the actuating mechanism and the ratchet.

7. A system according to claim 1, wherein:
the disengageable connection interface is formed by at least one pawl acting on at least one toothed portion.

8. A system according to claim 7, wherein:
the pawl or the toothed portion has an asymmetrical tooth profile configured and arranged to provide a "pumping" effect at least in movement to a tightening position.

9. A system according to claim 8, wherein:
the pawl is rockingly movable relative to the toothed portion;
the pawl and the elastic tensioning mechanism form a knuckle joint for switching between a stable tightening position and a stable loosening position;
the pawl includes two opposite pawl portions configured to alternatively engage at least one toothed wheel.

10. A system according to claim 9, wherein:
the pawl is rockingly movable in rotation along an axial rotational axis, relative to the toothed portion.

11. A system according to claim 7, wherein:
the pawl is axially movable in a housing of the body of the quick-release system.

12. A system according to claim 11, wherein:
the pawl is lockable by a locking mechanism in a loosening mode.

13. A system according to any of claim 1, further comprising:
an interface for friction differential between tightening and loosening modes, configured and arranged to promote slip between a support mechanism and tightening mechanism in a tightening direction, and the generation of friction between said support mechanism and said tightening mechanism in a loosening direction.

14. A system according to claim 13, wherein:
the rotatable member of the tightening sub-assembly includes a shaft provided with a threaded bore capable of engaging the threaded portion of the skewer; and
wherein the threaded portion of the skewer and the threaded portion of the bore have a pitch greater than 1.5 mm.

15. A system according to claim 13, wherein:
the friction differential interface includes a freewheel mechanism; and
the friction differential interface includes at least a selective retention mechanism including a freewheel slip ring having retaining edges that cooperate with notches, a tightening mechanism;
the freewheel ring includes radial blades with raised edges; and
the friction differential interface further includes a washer that is configured and arranged to promote slip between the freewheel ring and the tightening mechanism.

16. A system according to claim 1, further comprising:
a mechanism for recovering the torsional forces.

17. A system according to claim 16, wherein:
the mechanism for recovering torsional forces includes a polygonal shape arranged on the skewer, in a vicinity of the tightening sub-assembly.

18. A system according to claim 1, wherein:
the support surface of the tightening sub-assembly is mounted to rotate freely about said skewer during transmission of said tightening torque from said actuation sub-assembly to said tightening sub-assembly.

19. A quick-release device comprising:
a skewer extending in an axial direction and an end support element mounted at a first end of the skewer adapted to be supported by a first tightening support surface of a cycle: and
a quick-release system mounted at a second end of the skewer, said quick-release system comprising:
   a tightening sub-assembly including a rotatable member and a support surface, the support surface being configured and arranged to be supported by a second support surface of the cycle;
   an actuation sub-assembly including a movable actuating mechanism, capable of axial rotation around said skewer, and configured and arranged to transmit a tightening torque to the rotatable member of the tightening sub-assembly when the device is being tightened;
   a tightening torque limiting mechanism to limit torque transmitted by the actuation sub-assembly to the tightening sub-assembly;
   said tightening torque limiting mechanism forming a disengageable connection interface configured and arranged to limit torque transmitted by the actuation sub-assembly to the tightening sub-assembly to a limiting value of the torque or to a predefined range of tightening torque values;
   said disengageable connection interface comprising respective mutually engageable surfaces of the tightening sub-assembly and the actuation sub-assembly.

20. A device according to claim 19, wherein:
the skewer is made of a material having has a mechanical resistance to tension ranging between 450 and 950 Mpa.

21. A system according to claim 19, wherein:
the support surface of the tightening sub-assembly is mounted to rotate freely about said skewer during transmission of said tightening torque from said actuation sub-assembly to said tightening sub-assembly.

22. A wheel comprising:
a rim;
a hub;
an arrangement to connect the rim to the hub; and
a quick-release device comprising:
   a skewer extending in an axial direction and an end support element mounted at a first end of the skewer adapted to be support by a first tightening surface of a cycle: and
   a quick-release system mounted at a second end of the skewer, said quick-release system comprising:
      a tightening sub-assembly including a rotatable member and a support surface, the support surface being configured and arranged to be supported by a second support surface of the cycle;
      an actuation sub-assembly including a movable actuating mechanism, capable of axial rotation around said skewer, and configured and arranged to transmit a tightening torque to the rotatable member of the tightening sub-assembly when the device is being tightened;
      a tightening torque limiting mechanism to limit torque transmitted by the actuation sub-assembly to the tightening sub-assembly;
      said tightening torque limiting mechanism forming a disengageable connection interface configured and arranged to limit torque transmitted by the actuation sub-assembly to the tightening sub-assembly to a limiting value of the torque or or a predefined range of tightening torque values;
      said disengageable connection interface comprising respective mutually engageable surfaces of the tightening sub-assembly and the actuation sub-assembly.

23. A wheel according to claim 22, wherein:
the arrangement to connect the rim to the hub comprises spoke sets and/or a solid wheel body.

24. A wheel according to claim 22, wherein:
the skewer includes a polygonal-shaped portion arranged in an area of the tightening sub-assembly; and
the hub includes a complementary-shaped portion for receiving said polygonal-shaped portion.

25. A system according to claim 22, wherein:
the support surface of the tightening sub-assembly is mounted to rotate freely about said skewer during transmission of said tightening torque from said actuation sub-assembly to said tightening sub-assembly.

26. A quick-release system for a quick-release device for a cycle, such device including a skewer extending in an axial direction and an end support element mounted at a first end of the skewer adapted to be supported on a first tightening surface of the cycle, said quick-release system comprising:
a tightening sub-assembly including a support surface;
an actuation sub-assembly including a movable actuating mechanism, capable of axial rotation around said skewer, and configured and arranged to transfer a tightening torque to the tightening sub-assembly when the movable actuating mechanism is being moved in a tightening direction around said skewer;
a tightening torque limiting mechanism to limit torque transferred by the actuation sub-assembly to the tightening sub-assembly;
said tightening torque limiting mechanism forming a disengageable connection interface configured and arranged to limit torque transferred by the actuation sub-assembly to the tightening sub-assembly to a threshold tightening torque value or to a predefined range of threshold tightening torque values, while allowing continuous movement of the movable actuation mechanism in said tightening direction around said skewer after reaching the threshold tightening torque value or the predefined range of threshold tightening torque values.

27. A system according to claim 26, wherein:
the support surface of the tightening sub-assembly is mounted for axial rotation about said skewer.

28. A quick-release system for a quick-release device for a cycle, such device including a skewer extending in an axial direction and an end support element mounted at a first end of the skewer adapted to be supported on a first tightening surface of the cycle, said quick-release system comprising:
a tightening sub-assembly including a support surface;
an actuation sub-assembly including a movable actuating mechanism, capable of axial rotation around said skewer, and configured and arranged to transfer a tightening torque to the tightening sub-assembly when the movable actuating mechanism is being moved in a tightening direction;

a tightening torque limiting mechanism to limit torque transferred by the actuation sub-assembly to the tightening sub-assembly;

said tightening torque limiting mechanism forming a connection interface configured and arranged to enable transmission of said tightening torque in an engaged state of said connection interface and to limit torque transferred by the actuation sub-assembly to the tightening sub-assembly to a threshold tightening torque value or to a predefined range of threshold tightening torque values;

said connection interface being in a disengaged state during continuous movement of the movable actuation mechanism in the tightening direction after said threshold tightening torque value, or a value of said predefined range of threshold tightening torque values has been transferred.

29. A system according to claim 28, wherein:

the support surface of the tightening sub-assembly is mounted for axial rotation about said skewer.

* * * * *